(12) United States Patent
Foti et al.

(10) Patent No.: US 9,451,594 B2
(45) Date of Patent: Sep. 20, 2016

(54) METHOD AND APPARATUS FOR ASSOCIATING SERVICE PROVIDER NETWORK IDENTIFIERS WITH ACCESS NETWORK IDENTIFIERS

(71) Applicant: Telefonaktiebolaget L M Ericsson (publ), Stockholm (SE)

(72) Inventors: George Foti, Dollard des Ormeaux (CA); Peter Hedman, Helsingborg (SE); Juan Antonio Sanchez Herrero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 13/789,068

(22) Filed: Mar. 7, 2013

(65) Prior Publication Data

US 2013/0315155 A1 Nov. 28, 2013

Related U.S. Application Data

(60) Provisional application No. 61/651,804, filed on May 25, 2012.

(51) Int. Cl.
*H04W 72/04* (2009.01)
*H04L 12/24* (2006.01)
(Continued)

(52) U.S. Cl.
CPC ...... *H04W 72/0406* (2013.01); *H04L 41/0806* (2013.01); *H04W 4/005* (2013.01); *H04W 60/00* (2013.01); *H04W 8/265* (2013.01)

(58) Field of Classification Search
CPC .......... H04W 72/0406; H04W 60/00; H04W 4/005; H04W 8/265; H04L 41/0806
See application file for complete search history.

(56) References Cited

U.S. PATENT DOCUMENTS 5,678,179 A 10/1997 Turcotte et al.
8,780,796 B1 7/2014 Ballal et al.
(Continued)

FOREIGN PATENT DOCUMENTS

WO 2009103623 A2 8/2009
WO 2011062841 A1 5/2011
(Continued)

OTHER PUBLICATIONS

Third Generation Partnership Project, "3GPP TS 23.682 V11.0.0 (Mar. 2012)," 3rd Generation Partnership Project; Technical Specification Group Services and System Aspects; Architecture enhancements to facilitate communications with packet data networks and applications (Release 11). Mar. 2012. pp. 1-24.
(Continued)

*Primary Examiner* — Alpus H Hsu
*Assistant Examiner* — Anthony Luo
(74) *Attorney, Agent, or Firm* — Murphy, Bilak & Homiller, PLLC

(57) ABSTRACT

The teachings herein disclose methods and apparatuses for automatically binding external identifiers to service provider network identifiers. The external identifiers are allocated by an access network for use by a service provider network in identifying given wireless devices to the access network, where the service provider network is external to the access network. The service provider network identifiers are used to identify those same wireless devices within the service provider network, with respect to one or more services. The binding thus enables the service provider network to trigger communications with a targeted wireless device via the access network, by using the external identifier that is bound to the service provider network identifier of the targeted device, and sending trigger signaling to the access network that identifies the targeted wireless device via the external identifier.

27 Claims, 12 Drawing Sheets

(51) Int. Cl.
*H04W 4/00* (2009.01)
*H04W 60/00* (2009.01)
*H04W 8/26* (2009.01)

(56) References Cited

U.S. PATENT DOCUMENTS

| | | |
|---|---|---|
| 8,854,960 B2 | 10/2014 | Jain et al. |
| 8,953,508 B2 | 2/2015 | Zheng et al. |
| 2009/0023443 A1 | 1/2009 | Kieselmann et al. |
| 2009/0129263 A1* | 5/2009 | Osborn .................. 370/230 |
| 2010/0008259 A1* | 1/2010 | Yoon et al. .............. 370/254 |
| 2011/0125925 A1 | 5/2011 | Bouthemy et al. |
| 2011/0128911 A1 | 6/2011 | Shaheen |
| 2011/0164107 A1* | 7/2011 | Tian et al. ............... 348/14.08 |
| 2011/0207491 A1* | 8/2011 | Swaminathan ............ 455/509 |
| 2012/0042073 A1* | 2/2012 | Lassborn et al. ........... 709/225 |
| 2012/0257571 A1* | 10/2012 | Liao ...................... 370/328 |
| 2012/0265983 A1* | 10/2012 | Yegin et al. .............. 713/155 |
| 2012/0302229 A1 | 11/2012 | Rönneke |
| 2013/0016657 A1 | 1/2013 | Muhanna et al. |
| 2013/0017827 A1* | 1/2013 | Muhanna et al. ......... 455/426.1 |
| 2013/0142118 A1 | 6/2013 | Cherian et al. |
| 2013/0188515 A1 | 7/2013 | Pinheiro et al. |
| 2013/0196630 A1 | 8/2013 | Ungvari et al. |
| 2013/0203412 A1 | 8/2013 | Starsinic et al. |
| 2013/0212236 A1 | 8/2013 | Foti et al. |
| 2013/0273855 A1* | 10/2013 | Cherian et al. ............. 455/68 |
| 2013/0279373 A1 | 10/2013 | Ding et al. |
| 2013/0297744 A1 | 11/2013 | Foti |
| 2013/0310027 A1 | 11/2013 | Foti et al. |
| 2013/0315155 A1 | 11/2013 | Foti et al. |
| 2013/0318218 A1 | 11/2013 | Foti et al. |
| 2013/0332627 A1 | 12/2013 | Skog et al. |
| 2013/0339438 A1 | 12/2013 | Cherian et al. |
| 2014/0086143 A1 | 3/2014 | Foti et al. |
| 2014/0086144 A1 | 3/2014 | Foti et al. |
| 2014/0089442 A1 | 3/2014 | Kim et al. |
| 2014/0128113 A1 | 5/2014 | Zisimopoulos et al. |
| 2014/0185522 A1 | 7/2014 | Xu et al. |
| 2014/0219182 A1 | 8/2014 | Chandramouli et al. |
| 2014/0286237 A1 | 9/2014 | Bhalla |
| 2015/0045074 A1 | 2/2015 | Wong et al. |

FOREIGN PATENT DOCUMENTS

| | | |
|---|---|---|
| WO | 2011098150 A1 | 8/2011 |
| WO | 2012142618 A2 | 10/2012 |
| WO | 2013115946 A1 | 8/2013 |

OTHER PUBLICATIONS

Third Generation Partnership Project, "3GPP TS 23.682 V11.3.0 (Dec. 2012)," 3rd Generation Partnership Project; Technical Specification Group Services and System Aspects; Architecture enhancements to facilitate communications with packet data networks and applications (Release 11). Dec. 2012. pp. 1-29.

Author Unknown, "ETSI TS 102 690 V2.0.1 (Dec. 2011)," ETSI. Technical Specification. Machine-to-Machine Communications (M2M); Functional Architecture. Dec. 2011. pp. 1-238.

Author Unknown, "Liaison Statement Answer to 3GPP SA2 on MTC Identification Aspects," ETSI TC M2M. 3GPP TSG-SA WG1 Meeting #55; S1-112213; M2M(11)0519r3. Aug. 8-12, 2011. pp. 1-2. Dublin, Ireland.

Unknown, Author, "Machine-to-Machine communications (M2M); Functional architecture", ETSI TS 102 690 V1.1.1, Oct. 2011, 1-280.

3rd Generation Partnership Project, "3GPP TS 23.682 V11.1.0 (Jun. 2012)," 3rd Generation Partnership Project; Technical Specification Group Services and System Aspects; Architecture enhancements to facilitate communications with packet data networks and applications (Release 11). Jun. 2012. pp. 1-27.

3rd Generation Partnership Project, "3GPP TR 23.888 V1.6.1 (Feb. 2012)," 3rd Generation Partnership Project; Technical Specification Group Services and System Aspects; System Improvements for Machine-Type Communications (Release 11). Feb. 2012. pp. 1-165.

Author Unknown, "Mapping Aspects for ETSI M2M Architecture," 3GPP TSG SA WG2 Meeting #85; TD S2-112291; May 16-20, 2011. pp. 1-11. Xi'an, China.

Author Unknown, "M2M Service Enablement," Telefon AB LM Ericsson; M2M(12)19-076. Mar. 8, 2012. pp. 1-10.

European Telecommunications Standards Institute. "Machine-to-Machine communications(M2M); Functional architecture." ETSI Technical Committee Machine-to Machine Communications (M2M),Technical Specification, ETSI TS 102 690 V1.1.9, Sep. 2012, pp. 1-280.

* cited by examiner

METHOD AND APPARATUS FOR ASSOCIATING SERVICE PROVIDER NETWORK IDENTIFIERS WITH ACCESS NETWORK IDENTIFIERS

RELATED APPLICATIONS

This application claims priority from the U.S. provisional application filed on 25 May 2012 and assigned Application Ser. No. 61/651,804 and which is incorporated herein by reference.

TECHNICAL FIELD

The present invention generally relates to access networks and service provider networks that are external to such access networks, and particularly relates to obtaining and using external identifiers for devices connecting to a service provider network through an access network.

BACKGROUND

In an environment in which Machine-to-Machine (M2M) devices are connected to an M2M service provider (SP) through an access network provided by another entity, the M2M service provider effectively creates a service layer on top of the access network. This service layer is used to deliver services to the M2M devices through the access network, but doing so requires the use of device identifiers known to both the access network and the M2M SP network, for identifying the devices involved in such services. In the European Telecommunications Standards Institute (ETSI) M2M framework, the M2M SP interworks with the access network, for the M2M devices that have subscribed to the services provided by the M2M SP. This interworking is typically performed using an external identifier selected for that purpose. Other available identifiers include the Mobile Station International Subscriber Directory Number (MSISDN), the Internet Protocol Multimedia Public Identity (IMPU), etc.

External identifiers are typically allocated by the access network for respective M2M devices, and are used for interworking purposes between the access network and the service provider network. Use of the external identifier means that the access network does not have to share the IMSI or other such identifier, which is typically reserved for use as an access network private identity, and which is not used on external (public) interfaces, such as the interface with the service provider network.

The Third Generation Partnership Project (3GPP) R11 standards define external identifiers. As defined, an external identifier is associated only with MTC Device triggering procedures. However, the 3GPP specification does not describe how external networks can acquire the external identifier of a given M2M device for interworking purposes. Furthermore, the M2M ETSI standard does not consider the use of the MTC Device triggering procedure and the mechanism to acquire external identifiers from an access network, for triggering targeted M2M devices via the access network.

SUMMARY

The teachings herein disclose methods and apparatuses for automatically binding external identifiers to service provider network identifiers. The external identifiers are allocated by an access network for use by a service provider network in identifying given wireless devices to the access network, where the service provider network is external to the access network. The service provider network identifiers are used to identify those same wireless devices within the service provider network, with respect to one or more services. The binding thus enables the service provider network to trigger communications with a targeted wireless device via the access network, by mapping from the service provider network identifier to the bound external identifier, and sending trigger signaling to the access network that identifies the targeted wireless device via the external identifier.

In one embodiment, a first method is performed by a network node that is associated with a service provider network. The first method includes receiving a notification sent from an access network in response to a wireless device establishing a data session with the access network for communicating with the service provider network, and further includes reading an external identifier and service provider network identifier from the notification. Here, the external identifier is assigned by the access network for use by the service provider network in identifying the wireless device to the access network, and the service provider network identifies the wireless device within the service provider network with respect to a service.

The first method further includes binding the external identifier to the service provider network identifier and subsequently triggering communication with the wireless device via the access network. The triggering is done by determining the external identifier that was bound previously to the service provider network identifier of the wireless device targeted for communication, and sending trigger signaling toward the access network that indicates the external identifier.

In an example embodiment, a network node is configured to carry out the first method and it includes one or more communication interfaces that are configured to communicate with a node in or associated with an access network. The network node further includes a processing circuit that is operatively associated with the communication interface(s) and configured to receive a notification sent from the access network in response to a wireless device establishing a data session with the access network for communicating with the service provider network.

The processing circuit is further configured to read an external identifier and service provider network identifier from the notification. Here, the external identifier is assigned by the access network for use by the service provider network in identifying the wireless device to the access network, and the service provider network identifies the wireless device within the service provider network with respect to a service. Correspondingly, the processing circuit is configured to bind the external identifier to the service provider network identifier, and subsequently trigger communication with the wireless device via the access network, by determining the external identifier that was bound previously to the service provider network identifier and sending trigger signaling toward the access network that indicates the external identifier.

In another embodiment, a second method is implemented at a network node operative as an interworking function (IWF) between an access network and a service provider network. In an example implementation, the method includes receiving a notification sent from a Home Subscriber Server (HSS) or other node associated with the access network in response to a wireless device establishing a data session with the access network for communicating with the service provider network.

The second method further includes forwarding the notification to the service provider network, where the forwarded notification indicates an external identifier assigned by the access network for use by the service provider network in identifying the wireless device to the access network. The notification further indicates a service provider network identifier used by the service provider network for identifying the wireless device with respect to a service provided by the service provider network. In this manner, the IWF provides the service provider network with the information needed to automatically bind the external identifier to the service provider network identifier. That binding allows the service provider network to use the service provider network identifier to identify the wireless device within the domain of the service provider network identifier and then map that service provider network identifier to the external identifier, for identifying the wireless device to the access network.

In an example of a network node configured to implement the second method, a node is configured as the IWF, and it includes one or more communication interfaces configured to send signaling toward and to receive signaling from one or more nodes within an access network, and to send signaling toward and to receive signaling from one or more nodes within a service provider network.

The example node further includes a processing circuit that is operatively associated with the communication interface(s) and configured to receive a notification sent from a Home Subscriber Server (HSS) or other node associated with the access network in response to a wireless device establishing a data session with the access network for communicating with the service provider network. Correspondingly, the processing circuit is further configured to forward the notification to the service provider network, where the forwarded notification indicates an external identifier assigned by the access network for use by the service provider network in identifying the wireless device to the access network. The forwarded notification also indicates a service provider network identifier used by the service provider network for identifying the wireless device with respect to a service provided by the service provider network.

In another embodiment, a third method is implemented in an HSS that is in the access network, or, equivalently, is in a Core Network (CN) that is associated with the access network. As a further point of equivalency, the HSS may be considered to include certain Access/Authentication/Accounting (AAA) server functions.

The third method includes receiving a service provider network identifier from a wireless device in conjunction with the wireless device establishing a data session with the access network for communicating with a service provider network that uses the service provider network identifier to identify the wireless device with respect to a service provided by the service provider network. The third method further includes generating a notification and sending the notification toward the service provider network, e.g., to an IWF for forwarding to the service provider network. The notification indicates the service provider network identifier and further indicates an external identifier assigned by the access network for use by the service provider network in identifying the wireless device to the access network. The notification thus enables the service provider network to establish a binding between the service provider network identifier and the external identifier and subsequently trigger communication with the wireless device through the access network using the external identifier.

An example network node configured to implement the third method includes one or more communication interfaces configured to communicate with an IWF that communicatively links the access network to the service provider network. The node further includes a processing circuit that is operatively associated with the communication interface(s).

The processing circuit is configured to receive a service provider network identifier from a wireless device in conjunction with the wireless device establishing a data session with the access network for communicating with a service provider network that uses the service provider network identifier to identify the wireless device with respect to a service provided by the service provider network. Further, the processing circuit is configured to generate a notification that indicates the service provider network identifier and further indicates an external identifier assigned by the access network for use by the service provider network in identifying the wireless device to the access network.

Still further, the processing circuit is configured to send the notification toward the service provider network. Sending the notification in this manner thereby enables the service provider network to establish a binding between the service provider network identifier and the external identifier and subsequently trigger communication with the wireless device through the access network using the external identifier.

A fourth method is implemented in a wireless device and complements the methods described above. In an example implementation, the fourth method includes reading a service provider network identifier from provisioned information stored in the wireless device. Here, the service provider network identifier identifies the wireless device with respect to a service provided by a service provider network.

The fourth method further includes generating one or more messages for activating a data session with an access network, for communicating with the service provider network. The message(s) indicate the service provider network identifier, and the fourth method further includes establishing a data session with an access network, based on sending signaling to the access network that includes the one or more messages. This sending operation therefore enables the first, second and third methods to be performed, as described above, based on providing the access network with the service provider network identifier of the wireless device.

In an example implementation of a wireless device that is configured to perform the fourth method, the wireless device includes a communication interface, one or more storage devices, e.g., memory, and a processing circuit. The communication interface is configured to send signaling to and receive signaling from an access network, while the processing circuit is configured to communicate with the access network and with a service provider network that is external to the access network via signaling sent through the access network.

In particular, the processing circuit is configured to read a service provider network identifier from provisioned information stored in the one or more storage devices. The service provider network identifier identifies the wireless device with respect to a service provided by the service provider network. The processing circuit is further configured to generate one or more messages for activating a data session with the access network, for communicating with the service provider network. The one or more messages indicate the service provider network identifier and are sent as signaling from the wireless device to establish the data session with the access network.

In yet another embodiment, external identifiers are defined in such a way that the service provider network identifiers associated with them can be obtained from the external identifiers. Correspondingly, a fifth method in a network node associated with a service provider network includes receiving information from the access network comprising an indication of all external identifiers allocated by the access network to wireless devices that are associated with the service provider network.

According to this fifth method, the external identifiers are formed or otherwise structured so that the service provider network node can process them, to obtain the corresponding service provider network identifiers. That is, the external identifier allocated to any given one of the associated wireless devices is structured such that the service provider network node can process it to extract, derive or otherwise determine the service provider network identifier of that same wireless device.

Thus, the fifth method includes processing the information received from the access network, so that for every external identifier listed in the received information, the service provider network node extracts a first component part of the external identifier. Based on the structure of the external identifiers, the fifth method continues with determining the service provider network identifier of the wireless device from the first component part of the external identifier and binding the service provider network identifier to the external identifier.

For example, the service provider network node sends a subscription request to the access network, e.g., at power-on or as part of its initial processing, and receives a subscription response in return. The subscription response indicates all of the external identifiers allocated or reserved for a plurality of wireless devices that are associated with the service provider network, e.g., for a batch of wireless devices that have subscription agreements with the service provider network. The service provider network node processes the subscription response to extract the service provider network identifier from each one of the external identifiers indicated in the subscription response, and thereby creates a new listing, which pairs each external identifier with the corresponding service provider network identifier extracted therefrom.

In a subsequent step, for any given one of the wireless devices, the service provider network node uses the new listing to look up the external identifier that corresponds to the service provider network identifier of a given wireless device. The service provider network node uses the thus-obtained external identifier to, e.g., trigger communications with the given wireless device via trigger signaling sent through the access network.

With respect to any one or more of the above embodiments, the service provider network may comprise a Machine Type Communication (MTC) network, where the service provider network identifier is a Services Capability Layer ID (SCL-ID) associated with an MTC application that is implemented in a given wireless device. Thus, the methods and apparatuses can be understood as enabling a Machine-to-Machine (M2M) service provider (SP) network to automatically learn the association between the SCL-ID that identifies an MTC application hosted in a given wireless device and the external identifier that has been allocated by an access network for use in identifying that same MTC application/wireless device at an external interface between the access network and the M2M SP network.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
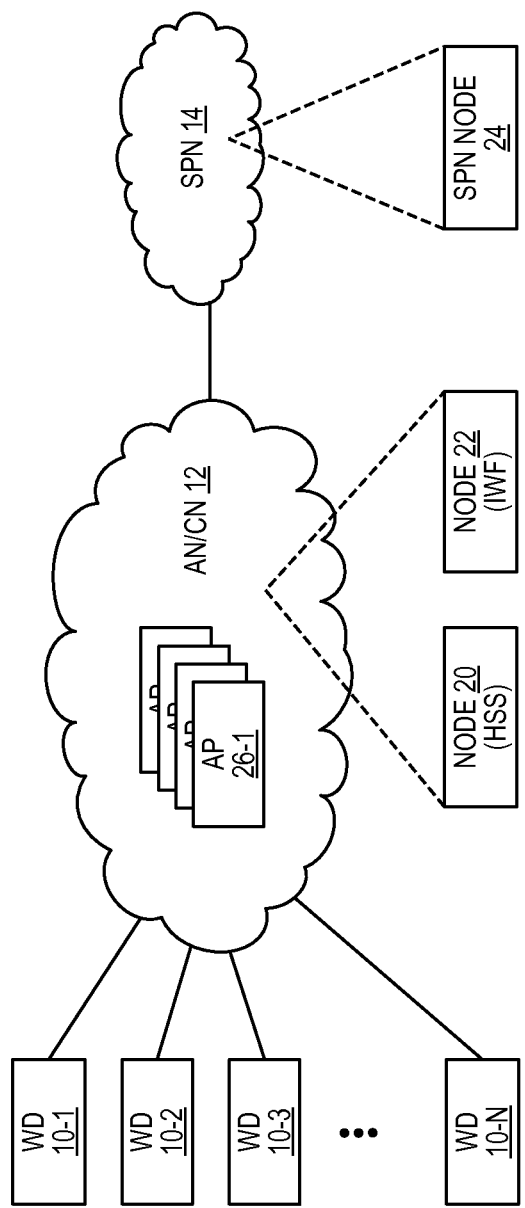
FIG. 1 is a block diagram of example access and service provider networks and associated wireless devices, according to one or more embodiments taught herein.

FIG. 1 illustrates a plurality of wireless devices 10, which are individually referenced as device 10-1, 10-2, and so on, when needed for clarity, and are otherwise referred to generically as "wireless devices 10" in the plural sense and as "wireless device 10" in the singular sense. While connectivity between the wireless devices 10 and an access network 12 is suggested in the diagram, it will be appreciated that not all of the wireless devices 10 are necessarily in operation or connected to the access network 12 at any given instant in time. Note that in the diagram, the access network 12 is abbreviated as "AN/CN 12" merely to connote that there generally are Core Network (CN) entities of interest herein. These entities are discussed later herein and for convenience are broadly referred to as access network entities.

For now, it should be understood that each wireless device 10 is configured for communication with the access network 12, and for communication with a service provider network 14, which is accessible to the wireless device 10 via the access network 12. In an example case, the access network 12 comprises a Third Generation Partnership Project (3GPP)

access network, such as a WCDMA- or LTE-based cellular data network, or a CDMA or HRPD network. Each wireless device 10 comprises a User Equipment or UE, which includes a 3GPP-based radio modem or other such transceiver circuitry for communicating with the 3GPP network. More broadly, the wireless device 10 includes a communication transceiver for communicating with the access network 12, which may be essentially any type of network usable for connecting to the service provider network 14, and includes processing circuitry configured for the appropriate protocols and signaling with respect to both such networks.

In more detail, the wireless device 10 is configured or otherwise provisioned with subscription credentials or other such authentication information as needed to attach to and establish a data session with the access network 12, and as needed for registering for a service provided by the service provider network 14, and communicating with the service provider network 14 in the context of that service. In a non-limiting example, the wireless device 10 hosts a Machine-Type-Communication (MTC) application that is subscribed to a Machine-to-Machine (M2M) service provided in the service provider network 14 operating as an M2M service provider (SP) network.

Thus, in initializing or otherwise initially registering the MTC application, the wireless device 10 would attach to the access network 12, establish a data session with the access network 12 for communicating with the service provider network 14, and then use that data session to register the MTC application in the M2M SP network. According to the advantageous teachings herein, various nodes in the access network 12 and in the service provider network 14 are configured to facilitate that initial registration in a manner that allows the service provider network 14 to bind a service provider network identifier with the corresponding external identifier. As noted, the service provider network 14 uses the service provider network identifier to identify the wireless device 10 with respect to a service provided by the service provider network 14, while the external identifier for the same wireless device 10 is assigned by the access network 12 to the wireless device 10, for use by the service provider network 14 in identifying the wireless device 10 to the access network 12, e.g., at an external interface to the access network 12, such as provided by an interworking function or IWF.

As those of ordinary skill in the art will appreciate, use of the external identifier allows the access network 12 to keep private the International Mobile Subscriber Identity (IMSI) or other such access network identifier of the wireless device 10. That is, the access network 12 does not provide the access network identifier of the wireless device 10 to the service provider network 14 and instead provides an external identifier that has been logically bound to the access network identifier within the access network 12.

In this manner, the IMSI or other sensitive access network identifier of the wireless device 10 is not compromised by releasing it to the external service provider network 14. However, the external identifier itself has no predefined meaning within the service provider network 14, because the service provider network 14 uses the service provider network identifier—e.g., an identifier embedded in service credentials provisioned within the wireless device 10—to identify the wireless device 10. Consequently, the service provider network 14 must learn the association between a given service provider network identifier representing a given wireless device 10 within the service provider network 14 and the corresponding external identifier that has been assigned to that same wireless device 10 by the access network 12. Thus, simply receiving an external identifier from the access network 12 is of little value to the service provider network 14 because it does not know in advance to which one of the plurality of wireless devices 10 the access network 12 has assigned the external identifier.

The teachings herein provide a number of methods and apparatuses for the service provider network 14 to automatically learn the association between a given external identifier as assigned to a given wireless device 10 by the access network 12 and the service provider network identifier used to identify that same wireless device 10 within the service provider network 14. In this regard, the teachings disclose advantageous example configurations for a Home Subscriber Server or HSS, as represented by the node 20, an interworking function or IWF, as represented by the node 22, a service provider network node 24, and the wireless device 10, which uses an access point 26-1, 26-2, and so on, in the access network 12 to access the service provider network 14. More particularly, the teachings herein disclose example operations at these respective nodes, which provide for an automatic and secure association between the service provider network identifier assigned in the service provider network 14 to any given one among a plurality of wireless devices 10, and the external identifier assigned to that same wireless device 10 by the access network 12.

Figure 2:
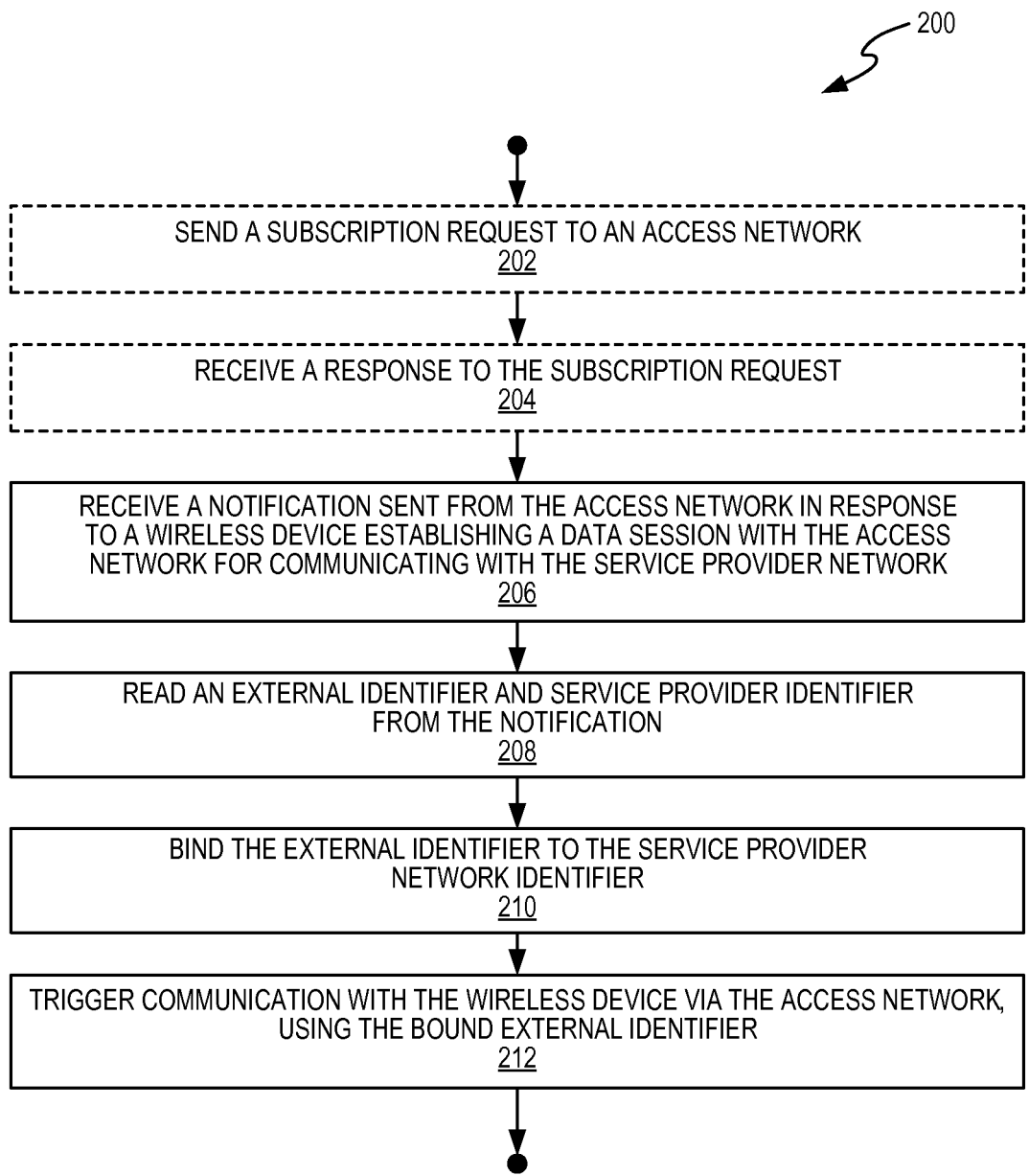
FIG. 2 is a logic flow diagram of one embodiment of a method of processing at a service provider network node.

FIG. 2 illustrates one aspect of such operations, by illustrating a method 200 implemented at a network node 24 that is associated with the service provider network 14. In some but not necessarily all embodiments, the method 200 includes steps 202 and 204 related to "subscription" operations, which will be described in more detail later herein. For now, steps 206, 208, 210 and 212 are described.

Thus, the method 200 includes receiving (Block 206) a notification that is sent from an access network 12 in response to a wireless device 10 establishing a data session with the access network 12 for communicating with the service provider network 14. In an example case, the wireless device 10 initially attaches to the access network 12 for the purpose of registering for a service from the service provider network 14—e.g., the wireless device 10 has subscription credentials authorizing it to use a service provided by the service provider network 14 and additionally has credentials or other authentication information allowing it to use the access network 12. Upon initial activation, the wireless device 10 uses its network credentials to attach to the access network 12 and to establish a data session with the access network 12, for the purpose of registering with the service provider network 14, for the service for which the wireless device 10 is credentialed.

Continuing, the method 200 includes reading (Block 208) an external identifier and service provider network identifier from the notification, where the external identifier is assigned by the access network 12 for use by the service provider network 14 in identifying the wireless device 10 to the access network 12, and where the service provider network 14 identifies the wireless device 10 within the service provider network 14 with respect to a service. Here, "reading" the external identifier and the service provider network identifier comprises reading values for those identifiers from the received notification, or, alternatively, for one or both of them, "reading" connotes mapping an indicator received in the notification to an identifier value or values stored at the network node 24.

The method 200 further includes binding (Block 210) the external identifier to the service provider network identifier, and subsequently triggering (Block 212) communication with the wireless device 10 via the access network 12 by determining the external identifier that was bound previously to the service provider network identifier and sending trigger signaling toward the access network 12 that indicates the external identifier. That is, the service provider network 14 identifies a given wireless device 10 to communicate with based on the service provider network identifier of that given wireless device 10 and it maps from the service provider network identifier to the external identifier that is bound to it—e.g., where such binding information may be maintained in non-volatile memory or other storage at the network node 24. The network node 24 then generates device trigger signaling that uses the external identifier, as mapped from the service provider network identifier, and sends the device trigger signaling toward the IWF 22, to trigger communication with the wireless device 10 via the access network 12.

Turning back to steps 202 and 204 included in some embodiments of the method 200, one sees that the network node 24 may be configured to send (Block 202) a subscription request to the access network 12, and correspondingly to receive a response to the subscription request (Block 204). The response may comprise a list of external identifiers that are or will be assigned by the access network 12 to wireless devices 10 that are associated with the service provider network 14.

In either case, the steps of sending the subscription request and receiving the response may be done as an initial step, e.g., a power on or during other initializing procedures at the network node 24 and the network node 24 may be provisioned with information identifying the access network 12 for purposes of sending the subscription request. It will be understood, then, that receiving the notification in step 206 may be based on previously sending the subscription request to the access network 12, e.g., to an IWF 22 that communicatively couples the network node 24 to the access network 12.

In such embodiments, the notification indicates the external identifier either by including the external identifier, or by including an index value indicating which external identifier has been assigned to the wireless device 10 by the access network 12, from within the list of external identifiers previously sent to the network node 24 by the IWF 22 in response to the subscription request.

Further, in at least some embodiments, the service provider network 14 comprises a MTC network, wherein the service provider network identifier is a SCL-ID associated with an MTC application implemented in the given wireless device 10. In such embodiments, the binding step (Block 210) comprises binding the external identifier to the SCL-ID, for subsequent use by the service provider network 14 in triggering communications with the wireless device 10 through the access network 12.

Figure 3:
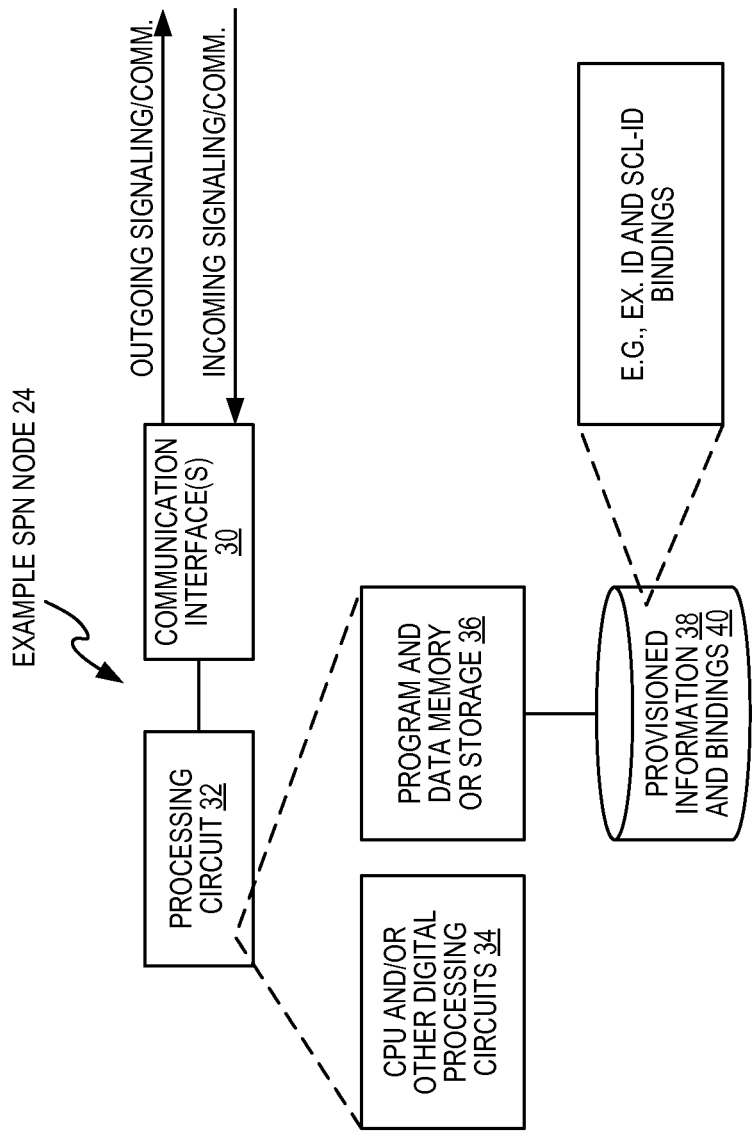
FIG. 3 is a block diagram of one embodiment of a service provider network node configured to perform the method of FIG. 2, for example.

FIG. 3 illustrates an example configuration of the network node 24, which is configured to perform the method 200, for example. The node 24 is denoted in the figure as the "SPN node" and it includes one or more communication interfaces 30 for communicating with the access network 12 and for communicating with the wireless device 10 via signaling conveyed through the access network 12. Thus, the communication interface(s) 30 may comprise more than one interface circuit, or at least may comprise processing circuitry that is configured to implement protocols for communicating with one or more nodes associated with the access network 12, e.g., the IWF 22, and for communicating with the wireless device 10 via the access network 12.

The node 24 further includes a processing circuit 32 that is configured to receive a notification that is sent from an access network 12 in response to a wireless device 10 establishing a data session with the access network 12 for communicating with the service provider network 14. For example, the wireless device 10 establishes a data session with the access network 12 for the purpose of registering with the service provider network 14.

The processing circuit 32 is further configured to read an external identifier and service provider network identifier from the notification, where the external identifier is assigned by the access network 12 for use by the service provider network 14 in identifying the wireless device 10 to the access network 12 and where the service provider network 14 identifies the wireless device 10 within the service provider network 14 with respect to a service. Still further, the processing circuit 32 is configured to bind the external identifier to the service provider network identifier, and to subsequently trigger communication with the wireless device 10 via the access network 12 by determining the external identifier that was bound previously to the service provider network identifier and sending trigger signaling toward the access network 12 that indicates the external identifier.

In some embodiments, the access network 12 is configured to send the notification based on having earlier received a subscription request from the service provider network 14. In such embodiments, the processor circuit 32 is configured to send the subscription request to an IWF 22 that communicatively couples the network node 24 to the access network 12, in advance of receiving the notification. For example, the network node 24 may send the subscription request as part of its power-on or initialization processing.

The notification received for any given wireless device 10 indicates the external identifier assigned to the wireless device either by including the external identifier, or by including an index value that indicates which external identifier has been assigned to the wireless device 10 by the access network 12, from within a list of external identifiers previously sent to the network node 24 by the IWF 22 in response to the subscription request. In the case that the external identifier is indicated by an index value, the processing circuit 32 is configured to map the index value to the corresponding external identifier—e.g., to index into the list.

The processing circuit 32 is configured, in at least some embodiments, to identify the access network 12 from provisioned information stored in the network node 24. Further, in at least some embodiments, the notification indicates an IP address assigned by the access network 12 to the wireless device 10, along with the external identifier and the service provider network identifier.

The service provider network 14 in one or more embodiments comprises a MTC network, and the service provider network identifier is a SCL-ID associated with an MTC application implemented in the given wireless device 10. The processing circuit 32 in such embodiments is configured to bind the external identifier to the service provider network identifier by binding the external identifier to the SCL-ID, for subsequent use by the service provider network 14 in triggering communications with the wireless device 10 through the access network 12.

The processing circuit 32 may comprise one or more CPUs and/or other digital processing circuits 34, which include or are associated with a computer-readable medium, such as program and data memory or other such storage 36. The storage 36 may comprise more than one memory device or other storage element, such as DRAM operating as working memory and FLASH or other non-volatile storage serving as program memory, binding memory, etc.

The non-volatile storage also holds provisioned information 38 in one or more embodiments. The provisioned information 38 may comprise information identifying the access network 12 and/or particularly identifying the IWF 22 to be used for communicating with the access network 12. The storage also may hold bindings 40, which may comprise data tables or other such logical data arrangements indicating the bindings between respective external identifiers and respective service provider network identifiers. There may be binding information for a plurality of wireless devices 10.

Further, the storage 36 in an example configuration stores a computer program comprising computer program instructions. The processing circuit 32 is configured to carry out the processing disclosed herein for the node 24 based at least partially on its execution of the stored computer program instructions, e.g., to carry out the method 200 as described above and/or variations thereof.

As such, the processing circuit 32 is configured to automatically bind external identifiers and corresponding service provider network identifiers for any number of wireless devices 10, based on receiving notifications for such devices from the access network 12. Here, "bind" means to map, link or otherwise logically associate, such as by storing the external identifier and the service provider network identifier together, or by storing a pointer or other data that indicates the pairing.

By performing this binding, the processing circuit 32 thereby establishes a mapping between the external identifier and the service provider network identifier, for subsequent use by the service provider network 14 in triggering communications with the wireless device 10 through the access network 12. For example, it may be that the node 24 needs to send a service-related message to the wireless device 10. The service identifies the wireless device 10 in terms of the service provider network identifier of the wireless device 10. However, for sending the message to the wireless device 10 via the access network 12, the node 24 uses the external identifier bound to the service provider network identifier.

Regardless of such variations, in one or more embodiments, the processing circuit 32 is further configured to subsequently identify the wireless device 10 for a communication related to the service, based on the service provider network identifier of the wireless device 10. Correspondingly, the processing circuit 32 is further configured to map the service provider network identifier to the external identifier, as previously bound to the service provider network identifier, and send the communication toward the wireless device 10 via the access network 12. Here, it will be understood that the communication outgoing from the node 24 uses the external identifier to identify the wireless device 10 to the access network 12.

Figure 4:
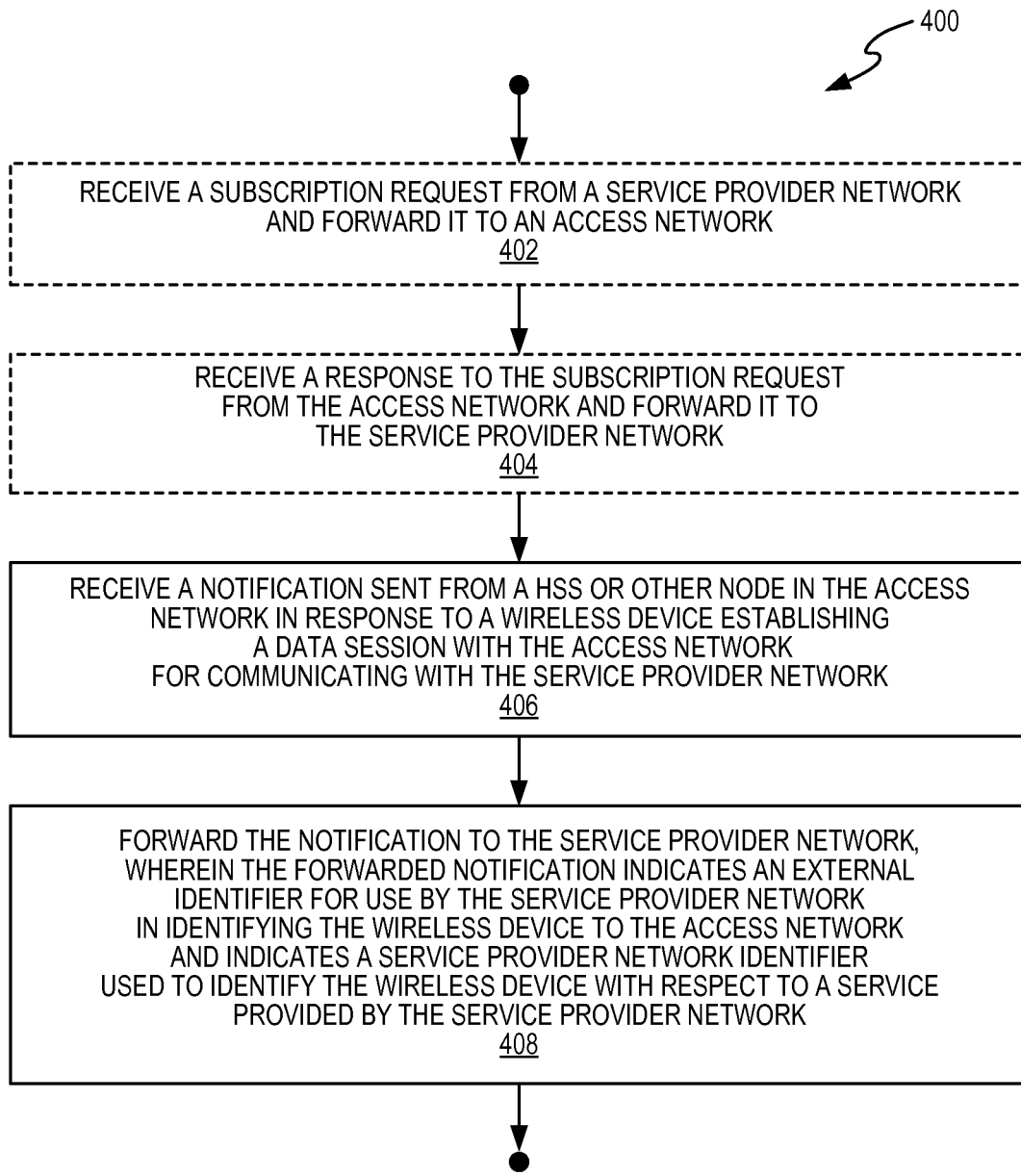
FIG. 4 is a logic flow diagram of one embodiment of a method of processing at a node configured to provide an interworking function (IWF) between an access network and a service provider network.

The operations at the node 24 in the service provider network 14 are complemented by corresponding, complementary operations at the IWF 22. FIG. 4 illustrates one embodiment of a method 400 implemented at the IWF 22, for providing such complementary operation in the access network 12.

Setting aside steps 402 and 404, which are not necessarily included in all embodiments, the method 400 includes receiving (Block 406) a notification that is sent from a HSS 20 or other node associated with the access network 12 in response to a wireless device 10 establishing a data session with the access network 12 for communicating with the service provider network 14. The method 400 further includes forwarding (Block 408) the notification to the service provider network 14. Here, "forwarding" will be understood to encompass a literal forwarding of the same message or the generation of a new but corresponding message, possibly having a different structure, format or protocol.

In either case, the forwarded notification indicates an external identifier assigned by the access network 12 for use by the service provider network 14 in identifying the wireless device 10 to the access network 14, and a service provider network identifier used by the service provider network 14 for identifying the wireless device 10 with respect to a service provided by the service provider network 14. For example, the wireless device 10 at issue in the notification is one among a plurality of wireless devices 10 that are associated with the service provider network 14, and the method 400 includes, in advance of receiving the notification from the HSS 20 or other node associated with the access network 12, receiving (Block 402) a subscription request from the service provider network 14. The subscription request indicates that notifications for individual ones among the plurality of wireless devices 10 should be sent to the service provider network 14 responsive to the individual wireless devices 10 establishing data sessions with the access network 12 for communicating with the service provider network 14.

In such embodiments, the method 400 further includes forwarding (Block 402) the subscription request to the HSS 20 or other node associated with the access network 12, such that the HSS 20 or other node subsequently sends the notification for the wireless device 10 based on having first received the forwarded subscription request. The method 400 in such embodiments further includes receiving (Block 404) a response to the forwarded subscription request from the HSS 20 or other node associated with the access network 12, and forwarding (Block 404) the response to the service provider network 14. In an example embodiment, the forwarded response indicates a list of external identifiers that are or will be used by the access network 12 for allocation to respective ones of the plurality of wireless devices (10) that are known at the HSS 20 to be associated with the service provider network 14.

As such, in the context of the method 400, it will be understood that the IWF 22 is not necessarily the entity that decides whether notifications will or will not be provided to the service provider network 14. The IWF 22 may simply act as an intermediary between the HSS 20 or other access network node and the service provider network node 24, in which role the IWF 22 receives a subscription request from the service provider network 14 and forwards that subscription request to the HSS 20. In turn, the HSS 20 responds to the subscription request by later providing a notification for any given wireless device 10 that is associated with the service provider network 14, and the IWF 22 passes along such notifications as sent to it by the HSS 20—i.e., the IWF 22 sends a notification to the service provider network 14 in dependence on first receiving the notification from the HSS 20.

Figure 5:
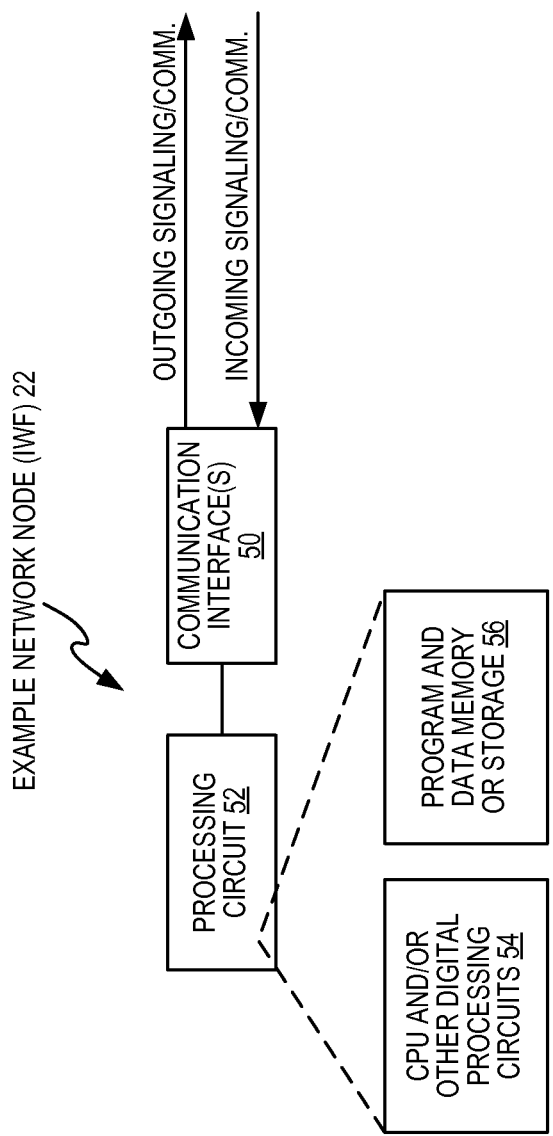
FIG. 5 is a block diagram of one embodiment of an IWF node configured to perform the method of FIG. 4, for example.

FIG. 5 illustrates an example embodiment of the IWF 22, e.g., as configured to carry out the method 400 or variations thereof. The IWF 22 implements an interworking function between an access network 12 and a service provider network 14, and it includes one or more communication interfaces 50 and a processing circuit 52.

The one or more communication interfaces 50 are configured to send signaling toward and to receive signaling from one or more nodes within the access network 12, e.g., an HSS 20, and to send signaling toward and to receive signaling from one or more nodes within the service provider network 14, e.g., the service provider network node 24. The processing circuit 52 is operatively associated with the one or more communication interfaces 50 and is configured to receive a notification that is sent from a HSS 20 or other node associated with the access network 12 in response to a wireless device 10 establishing a data session with the access network 12 for communicating with the service provider network 14, and forward the notification to the service provider network 14.

The forwarded notification indicates an external identifier assigned by the access network 12 for use by the service provider network 14 in identifying the wireless device 10 to the access network 14, and a service provider network identifier used by the service provider network 14 for identifying the wireless device 10 with respect to a service provided by the service provider network 14. As such, the forwarded notification enables the service provider network node 14 to automatically learn the correspondence between the external identifier of a given wireless device 10 and the service provider network identifier of that same wireless device 10.

As noted, the wireless device 10 may be one among a plurality of wireless devices 10 that are associated with the service provider network 14 and the processing circuit 52 in one or more embodiments is further configured to, in advance of receiving the notification from the HSS 20 or other node associated with the access network 12, receive a subscription request from the service provider network 14, indicating that notifications for individual ones among the plurality of wireless devices 10 should be sent to the service provider network 14 responsive to the individual wireless devices 10 establishing data sessions with the access network 12 for communicating with the service provider network 14, and forward the subscription request to the HSS 20 or other node associated with the access network 12. In such embodiments, the HSS 20 or other node subsequently sends the notification for the wireless device 10, based on having first received the forwarded subscription request.

Further in such embodiments, the processing circuit 52 is configured to receive a response to the forwarded subscription request from the HSS 20 or other node associated with the access network 12, and to forward the response to the service provider network 14. For example, the forwarded response indicates a list of external identifiers that are or will be used by the access network 12 for allocation to respective ones of the plurality of wireless devices 10. Subsequently sent notifications can then indicate specific external identifiers from the list by including an index value or list pointer.

As will be understood by those of ordinary skill in the art, the processing circuit 52 may be implemented as one or more microprocessor-based, DSP-based, or FPGA/ASIC-based processing circuits. More generally, the processing circuit 52 comprises one or more digital processing circuits 54 that comprise fixed circuitry, programmed circuitry, or some combination thereof.

In at least one embodiment, the digital processing circuit(s) 54 include or are associated with a computer-readable medium, such as one or more memory or storage elements 56, for storing data and program instructions. In at least one such embodiment, the memory or storage elements 56 store computer program instructions for execution by the digital processing circuit(s) 54, where such execution configures that circuitry to carry out the method 400 or variations thereof. Also note that the memory or storage elements 56 also may be used by the processing circuit 52 to hold, at least temporarily, notifications and subscription information, such as listings of external identifiers sent from the HSS 20 and forwarded by the IWF 22 to the service provider network 14.

Figure 6:
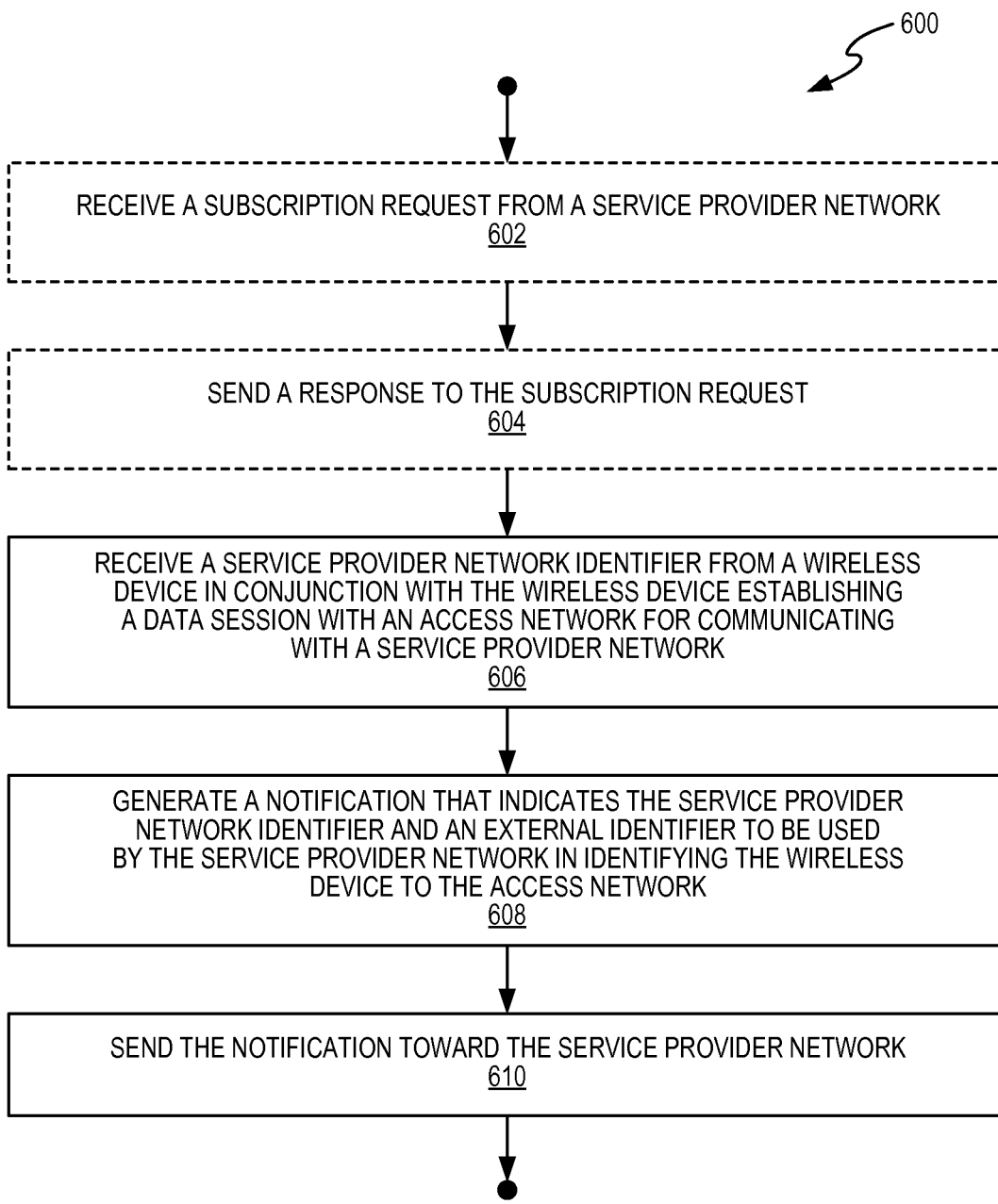
FIG. 6 is a logic flow diagram of one embodiment of a method of processing at an HSS or other node within an access network.

FIG. 6 introduces a method 600, which is implemented at the HSS 20 (or another appropriately configured access network node), and which complements the method 200 implemented by the service provider network node 24, and the method 400 implemented by the IWF in the node 22. The method 600 includes steps 602 and 604 representing subscription-related operations that are not necessarily implemented in all embodiments.

Setting aside the subscription-related operations momentarily, the method 600 includes: receiving (Block 606) a service provider network identifier that is sent from a wireless device 10 in conjunction with the wireless device 10 establishing a data session with the access network 12 for communicating with a service provider network 14 that uses the service provider network identifier to identify the wireless device 10 with respect to a service provided by the service provider network 14; generating (Block 608) a notification that indicates the service provider network identifier and further indicates an external identifier assigned by the access network 12 for use by the service provider network 14 in identifying the wireless device 10 to the access network 12; and sending (Block 610) the notification toward the service provider network 14.

Sending the notification enables the service provider network 14 to establish a binding between the service provider network identifier and the external identifier. In turn, having that binding at the service provider network 14 enables the service provider network 14 to subsequently trigger communication with the wireless device 10 through the access network 12 using the external identifier. Sending in this regard comprises, e.g., sending the notification to the IWF 22, for forwarding to the service provider network 14.

In embodiments that involve subscription requests, the method 600 includes initial steps 602 and 604. That is, the method 600 includes receiving (Block 602) a subscription request from the service provider network 14 and responding (Block 604) to the subscription request by sending a response that indicates a list of external identifiers for allocation by the access network 12 to individual ones among a plurality of wireless devices 10 that are associated with the service provider network 14. Sending the notification for any given wireless device 10 therefore may be performed in dependence on having first received the subscription request. Further, in such embodiments, the notification for any given wireless device 10 may include an index value or other pointer identifying the external identifier within the list.

Figure 7:
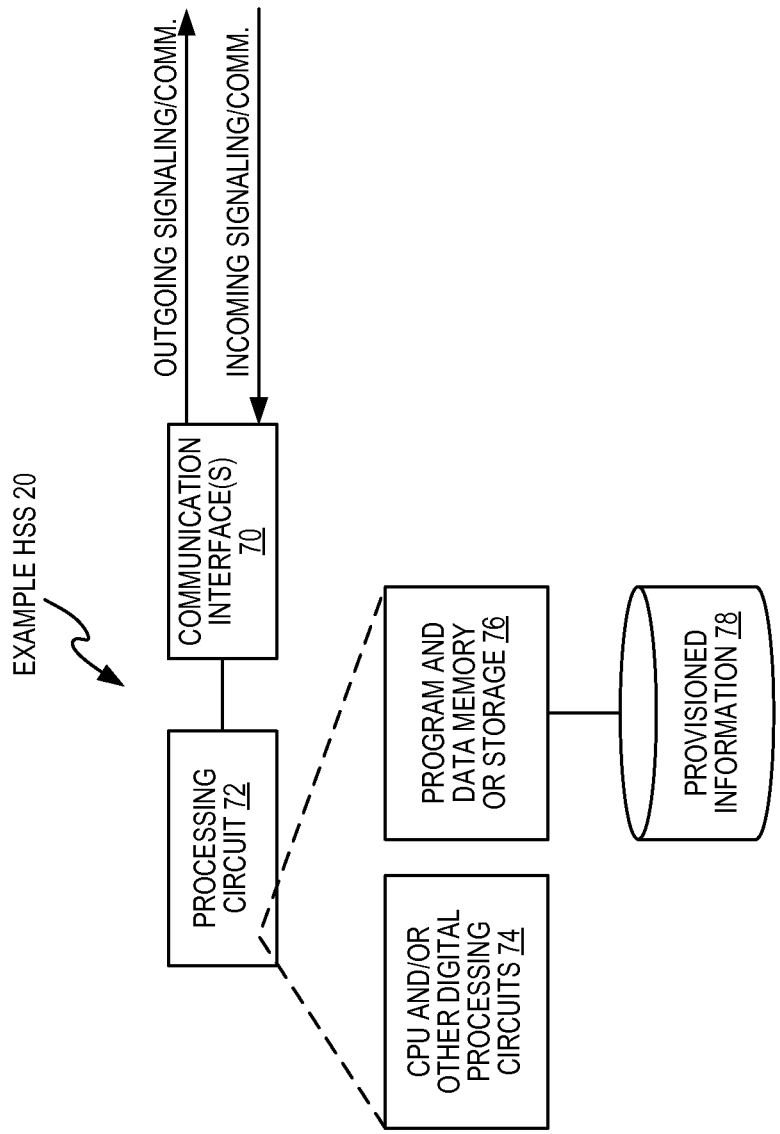
FIG. 7 is a block diagram of one embodiment of an HSS or other node within the access network that is configured to perform the method of FIG. 6, for example.

FIG. 7 illustrates an embodiment of an HSS 20 configured for use in or with an access network 12 and which is operative to perform the method 600 or variations thereof. The HSS 20 comprises one or more communication interfaces 70 and a processing circuit 72 that is operatively associated with the communication interface(s) 70. The processing circuit 72 comprises one or more CPUs or other digital processing circuits 74. The digital processing circuit(s) 74 include or are associated with a computer-readable medium program, such as program and data memory 76, which may comprise more than one memory circuit and more than one type of memory (e.g., volatile, working storage and non-volatile program and/or configuration data storage).

The program and data memory 76 may store provisioned information 78 identifying one or more service provider networks 14, network address or other contact information for the service provider network(s) 14, and access network identifiers for the wireless devices 10 that are associated with each such service provider network 14. For example, the provisioned information 78 includes a listing of IMSIs for those wireless devices 10 that have subscriptions with a given servicer provider network 14, along with lists or ranges of external identifiers for those wireless devices 10.

The one or more communication interfaces 70 are configured to communicate with an IWF 22 that communicatively links the access network 12 to a service provider network 14 that is external to the access network 12. In response to a given wireless device 10 establishing a data session with the access network 12 for communicating with a service provider network 14, the processing circuit 72 is configured to send a notification toward the service provider network 14. The notification indicates an external identifier assigned to the wireless device 10 for use by the service provider network 14 in triggering communication toward the wireless device 10 through the access network 12, and further indicates the service provider network identifier of the wireless device 10.

In more detail, in response to a wireless device 10 establishing a data session with the access network 12 for communicating with the service provider network 14, the processing circuit 72 is configured to receive a service provider network identifier from a wireless device 10 in conjunction with the wireless device 10 establishing the data session with the access network 12. As noted, the service provider network 14 uses the service provider network identifier to identify the wireless device 10 with respect to a service provided by the service provider network 14.

The processing circuit 72 is further configured to generate a notification that indicates the service provider network identifier and further indicates an external identifier assigned by the access network 12 for use by the service provider network 14 in identifying the wireless device 10 to the access network 12, and send the notification toward the service provider network 14. Sending a notification that indicates both the external identifier and the corresponding service provider network identifier, enables the service provider network 14 to establish a binding between the service provider network identifier and the external identifier and subsequently trigger communication with the wireless device 10 through the access network 12 using the external identifier.

In at least some embodiments, the processing circuit 72 is configured to receive a subscription request from the service provider network 14 and respond to the subscription request by sending a response that indicates a list of external identifiers for allocation by the access network 12 to individual ones among a plurality of wireless devices 10 that are associated with the service provider network 14. In such embodiments, the processing circuit 72 is configured to send the notification in dependence on having first received the subscription request, and wherein notification includes an index value or other pointer identifying the external identifier within the list.

There may be a potentially large plurality of wireless devices 10 that are a priori known from the provisioned information 78 at the HSS 20 to be associated with the service provider network 14. Thus, the subscription request is understood to be a general request for notifications for individual ones of the wireless devices 10 at whatever later times those individual wireless devices 10 establish data sessions with the access network 12 for communicating with the service provider network 14.

Figure 8:
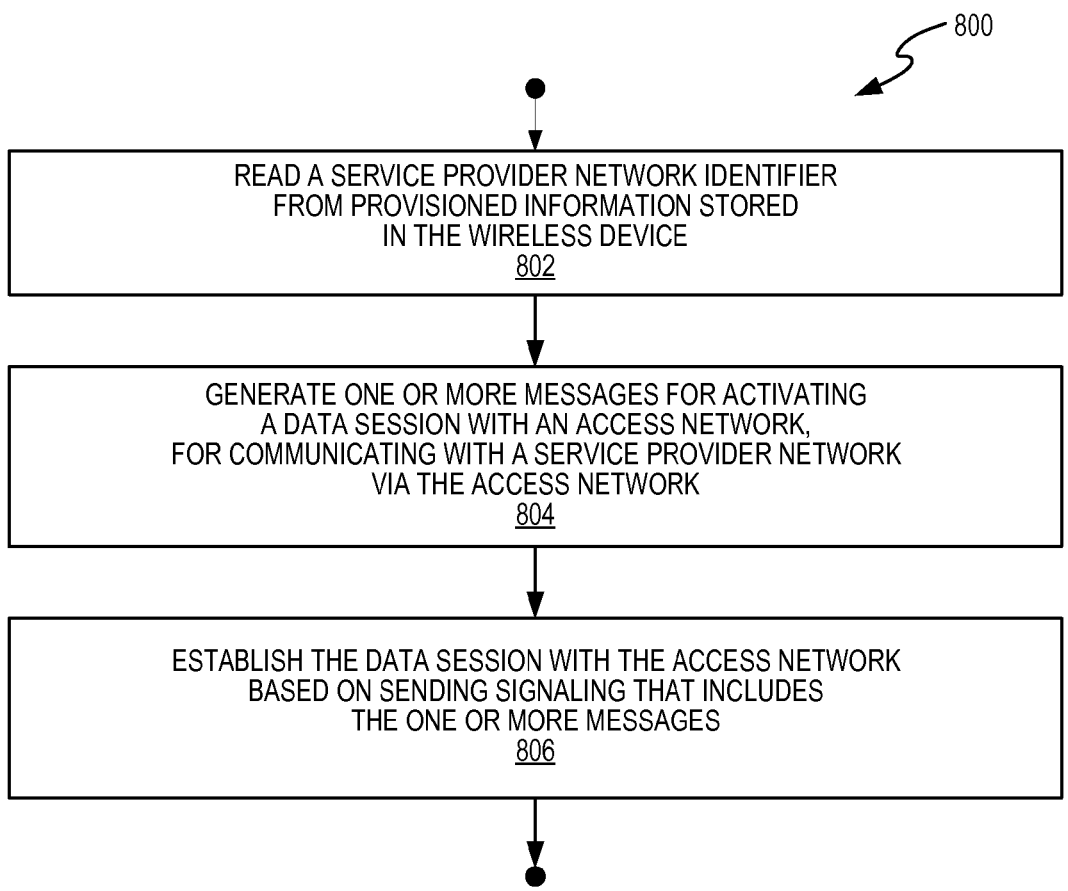
FIG. 8 is a logic flow diagram of one embodiment of a method of processing at a wireless device.

FIG. 8 illustrates one embodiment of a complementary or supporting method performed at a wireless device 10. It will be understood that the illustrated method 800 provides one basis taught herein for enabling the HSS 20 or other access network node to logically connect the external identifier and the service provider network identifier of a given wireless device 10.

The method 800 includes reading (Block 802) a service provider network identifier from provisioned information stored in the wireless device 10 and generating (Block 804) one or more messages for activating a data session with an access network 12, where the data session is to be used for communicating with a service provider network 14 via the access network 12. In this regard, the wireless device 10 may have different functional parts, such as a network access part that has authentication keys or is otherwise credentialed for accessing the access network 12, and a service provider network part that has credentials for accessing a service provided by the service provider network 14. In any case, the wireless device 10 indicates its service provider network identifier as part of sending the one or more messages for activation of the data session. In an advantageous example use of such information, the access network 12 passes along to the service provider network 14 the service provider network identifier as received from the wireless device 10, along with the corresponding external identifier allocated to the wireless device 10.

The method 800 further includes establishing (Block 806) the data session with the access network 12. Establishing the data session includes sending signaling that includes the one or more messages mentioned above. For example, in a UMTS-based example, the wireless device 10 and the access network 12 perform a Packet Data Protocol (PDP) Context establishment procedure, in which establishing the data session comprises activating the PDP context. In an LTE-based example of the wireless device 10 and the access network 12, establishing a data session 12 may comprise performing an Evolved Packet System (EPS) Bearer Setup.

Figure 9:
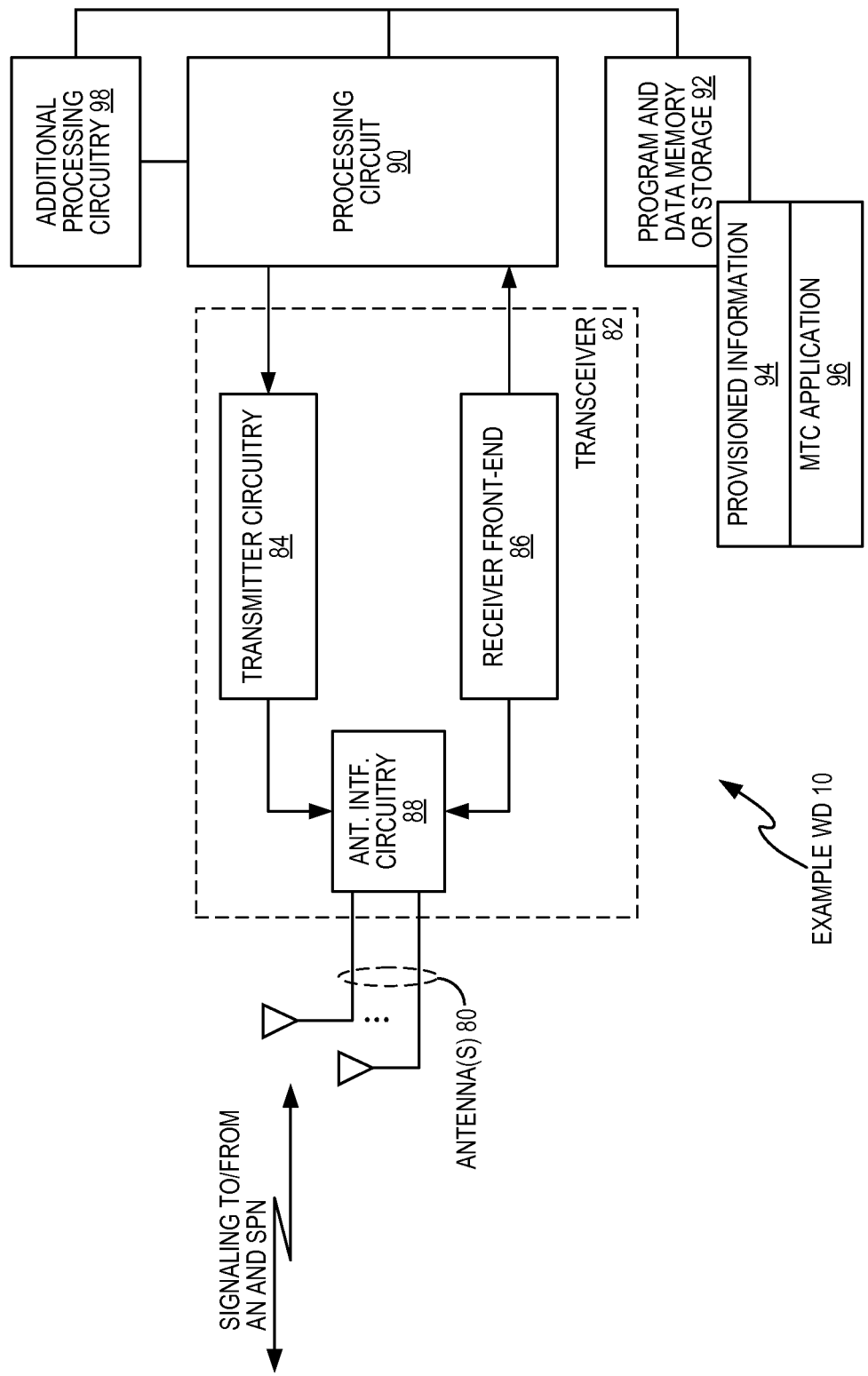
FIG. 9 is a block diagram of one embodiment of a wireless device configured to perform the method of FIG. 8, for example.

Turning to an example wireless device 10, FIG. 9 illustrates one embodiment of a wireless device 10 that includes one or more transmit and receive antennas 80 and an associated communication transceiver 82. The communication transceiver 82 includes transmitter circuitry 84, a receiver front-end 86, and antenna interface circuitry 88. The wireless device 10 further includes one or more processing circuits 90, which include or are associated with program data memory or other such storage 92. The storage 92 includes, for example, provisioned information 94 and an application 96 that uses a service provided by the service provider network 14. In an example case, execution of the application 96 by the processing circuit 90 configures the wireless device 10 for communication with the service provider network 14.

The application 96 may comprise a MTC application and the provisioned information 94 may include subscription credentials or other information enabling the MTC application to use an M2M service provided by a service provider network 14. In one example, then, the processing circuit 90 or other functional element within the wireless device 10 is configured to read the service provider network identifier of the wireless device 10 from the provisioned information 94. Of course, one wireless device 10 may have more than one service provider network identifier assigned to it, e.g., in the case where the wireless device 10 hosts more than one application that is authorized to use a service provider network 14. It will be understood that such processing can be performed for each of one or more service provider network identifiers and each of one or more service provider networks 14.

In any case, it will be understood that the processing circuit 90 may comprise baseband processing circuits and other supporting circuitry needed for authenticating to the access network 12 and communicating with the access network 12, via the transceiver 82. For example, the transceiver 82 may comprise a cellular radio transceiver configured according to one or more cellular network standards, such as the GSM, WCDMA and/or LTE standards.

Further, while such functionality may be implemented using functionally or physically separate processors, the processing circuit 90 may further include one or more "application processors," which are microprocessors or other digital processing circuitry configured to host/execute the application 96. The additional processing circuitry 98 may supplement such functionality, e.g., by providing user interfaces, I/O circuitry for interfacing with monitoring and/or control systems, etc.

The processing circuit 90 is further configured to establish a data session with the access network 12, and, as part of establishing the data session, to indicate to the access network 12 the service provider network identifier that is provisioned in the wireless device 10 with respect to a service provided by the service provider network 14.

The service provider network 14 is an MTC network in an example configuration, and the application 96 is an MTC application that interacts with an M2M service provided by the MTC network. As such, the processing circuit 90 is configured to perform the registration for the service as an M2M SCL registration with the MTC network.

Figure 10:
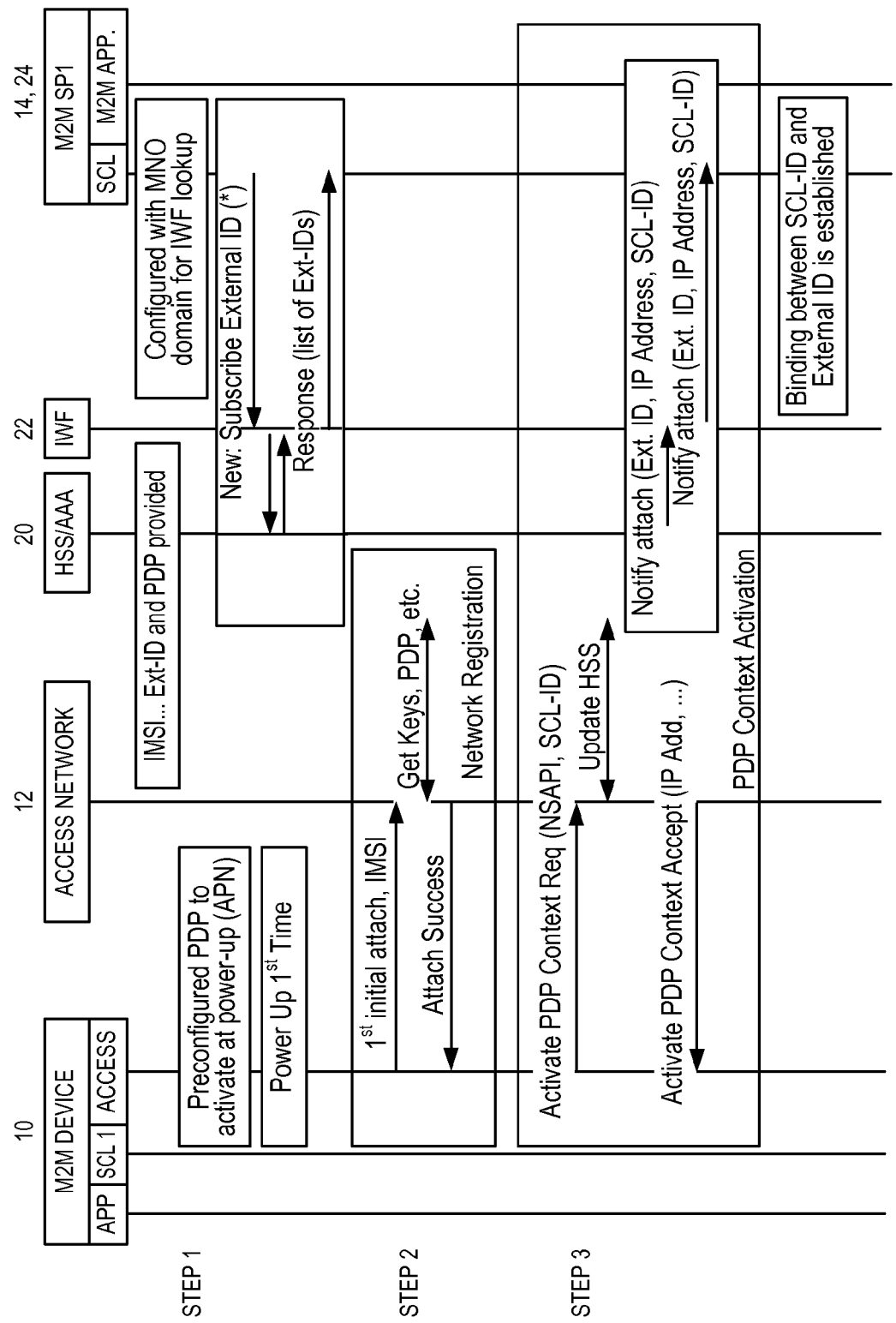
FIG. 10 is a signal flow diagram of an overall set of signaling between a service provider network node, an IWF node, an HSS node, and a wireless device, according to one embodiment of the teachings herein.

FIG. 10 illustrates one embodiment for the overall signal or call flow in such a MTC-based embodiment and it will be understood that the call flow of FIG. 10 serves as a specific example of the methods 200, 400, 600 and 800, being performed at the respective nodes or entities, including the service provider network node 24, the IWF 22, the HSS 20 and the wireless device 10.

In the approach depicted in the call flow of FIG. 10, any new M2M device—e.g., a wireless device 10 hosting an M2M application—attaching for the first time will be forced to establish a data session with the access network 12, so that it can pass its SCL-ID as a PCO (Protocol Configuration Option) during that process. The SCL-ID makes its way to the HSS 20. For purposes of this discussion, the HSS 20 may be considered to incorporate Access/Authentication/Accounting (AAA) RADIUS capability.

The SCL-ID may be stored in the HSS 20 and forwarded to the IWF 22, e.g., in a corresponding notification sent toward the service provider network 14 via the IWF 22. That is, the SCL-ID will be sent to the M2M Network Services Capability Layer (NSCL) in a notification message (NOTIFY), along with the external ID allocated to the M2M device by the access network 12. The M2M SP NSCL will be understood as being implemented in the service provider network 14, e.g., in the service provider network node 24.

In Step 1 of the call flow, at power on or other initialization, the M2M SP NSCL subscribes to the IWF 22 belonging to the access network 12 in question, requesting notification of the external identifier when an M2M device is allocated a new IP address. The IWF 22 in turn subscribes to HSS 20 for this information. The HSS/AAA 20 responds to the subscription request from the IWF 22, which in turn returns an acknowledgement response to the M2M SP NSCL. Given that this is the first subscription, the returned response includes the external identifiers allocated to the M2M devices associated with the M2M SP and the corresponding SCL-IDs of those devices.

In Step 2, a given one of the M2M devices (access part) is authenticated for network access. Once successfully authenticated, the M2M device access profile is downloaded in the access network for enforcement purposes.

In Step 3, the SCL of the M2M device establishes a bearer with an APN 26 that corresponds to the service provider network 14, and the SCL of the M2M device includes its SCL-ID as a PCO. This implies that each SCL within the M2M device knows the APN 26 associated with it, for use in establishing the data session. Such information may be preconfigured (provisioned) in the M2M device.

Following bearer establishment, the HSS 20 receives the SCL-ID and sends a notification to the IWF 22, including the SCL-ID and the external identifier allocated to the SCL-ID. The IWF 22 in turn forwards that information to the M2M SP NSCL. This information, as received by the M2M SP NSCL enables the M2M SP NSCL to establish and maintain a binding between the SCL-ID and the external ID indicated by the notification received for the M2M device.

Figure 11:
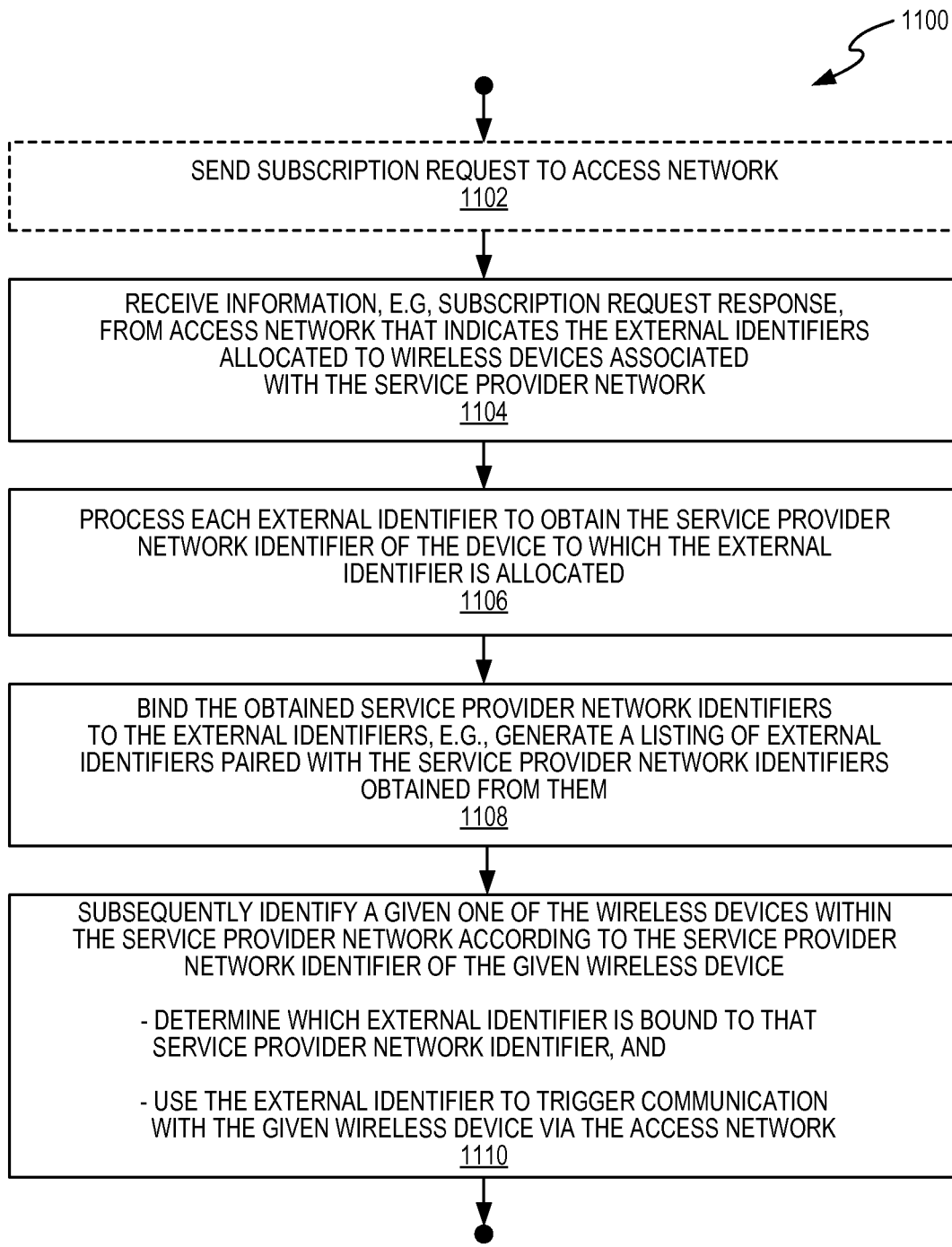
FIG. 11 is a logic flow diagram of one embodiment of another method at a network node associated with a service provider network.

The above teachings may be understood as the M2M device signaling its SCL-ID to the access network 12 as part of establishing a data session with the access network 12 for communicating with a service provider network 14. More generally, a wireless device 10 signals its service provider network identifier to the access network 12, as part of establishing a data session with the access network 12 for communicating with a service provider network 14. However, FIG. 11 illustrates one embodiment of an alternative method, which relies on a particular definition or structure of the external identifiers.

The method 1100 is performed, e.g., in the service provider network node 24 and it includes receiving (Block 1104) information from the access network 12, e.g., via the IWF 22. The received information indicates the external identifiers allocated to wireless devices 10 that are associated with the service provider network 14. This information is, for example, known to the HSS 20 or other access network node, based on provisioned information. Also of note, the information may be received as a "subscription request response," at least in embodiments of the method 1100 that include an initial step of sending (Block 1102) a subscription request to the access network 12. As an alternative, the access network 12 may be configured to push such information toward the service provider network 14.

In an example configuration, the service provider network node 24 is configured to send a subscription request at least at power-on or as part of its initial processing, and the access network 12 is configured to return a subscription request response that indicates the external identifiers allocated to all wireless devices 10 that are associated with the service provider network 14—here, "all" can be understood as being that set of wireless devices 10 that are known to be associated with the service provider network 14, from provisioning information in the HSS 20 or elsewhere within the access network 12.

The method 1100 continues with processing (Block 1106) the information received from the access network 12. This processing includes, for each external identifier, processing the external identifier to obtain the service provider network identifier of the wireless device 10 to which the external identifier is allocated. As such, it will be understood that the method 1100 is predicated on the external identifiers being formed in such a way to include the corresponding service provider network identifiers, or, more generally, to be formed in such a way that the service provider network identifiers may be extracted, derived, or otherwise obtained from them.

In an example case, the external identifier comprises first and second component parts, wherein the first component part is, or is based on, the service provider network identifier of the wireless device 10 to which the external identifier is allocated. Thus, the method 1100 may continue with the service provider network node 24 binding the service provider network identifiers with their respective external identifiers. For example, the node 24 may generate a list or other data structure that logically binds each service provider network identifier with the external identifier from which it was obtained (Block 1108).

Still further, the method 1100 at some subsequent time includes (Block 1110) identifying the wireless device 10 within the service provider network 14 according to the service provider network identifier, determining which external identifier is bound to that service provider IP network identifier, and using the bound external identifier to trigger communication with the wireless device 10 via the access network 12.

It will be appreciated that the processing circuit 32 of the service provider network node 24 can be configured to perform the method 1100 as an alternative to the method 200, or to perform both methods.

Figure 12:
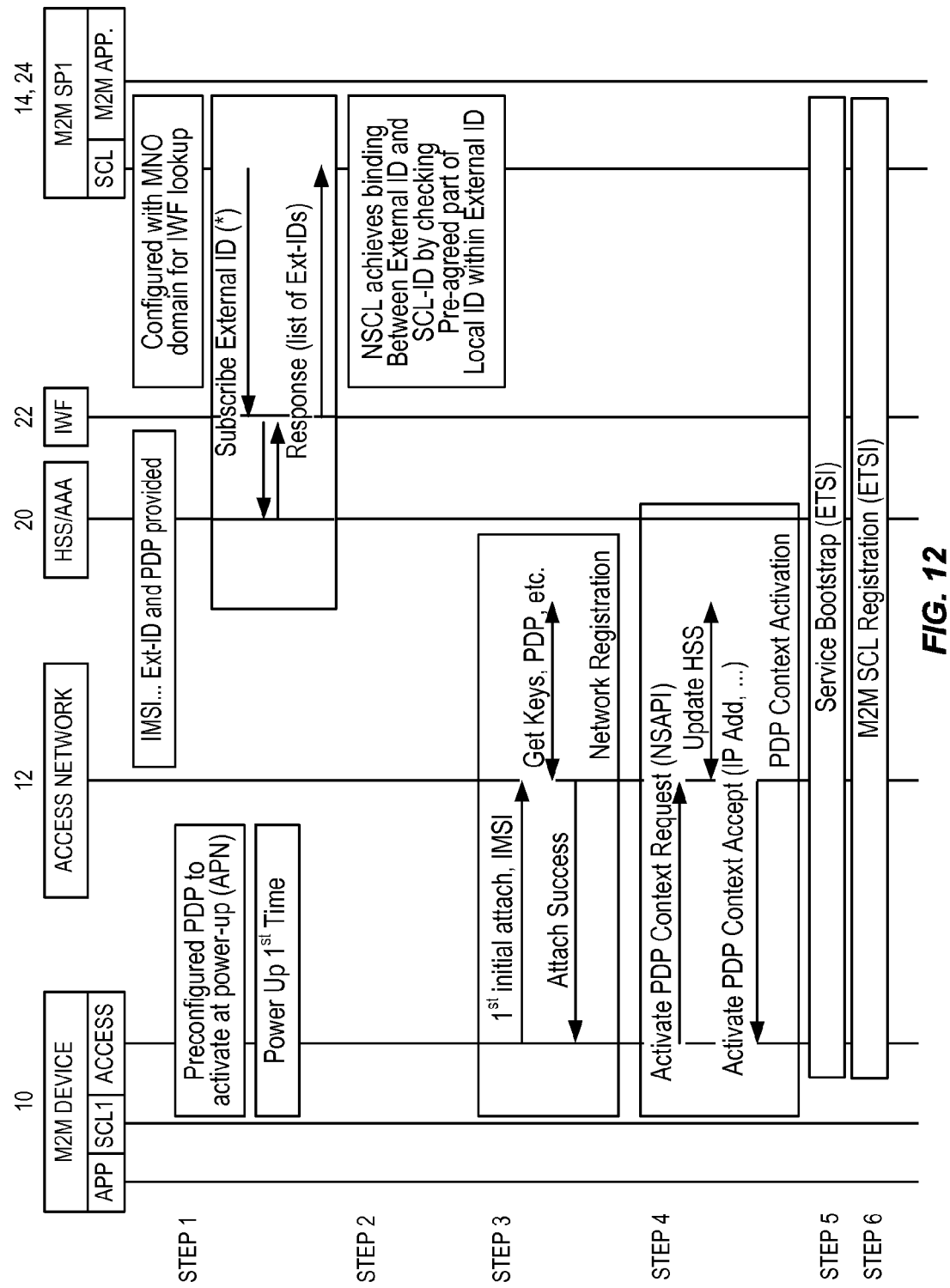
FIG. 12 is a signal flow diagram of an overall set of signaling between a service provider network node, an IWF node, an HSS node, and a wireless device, corresponding to the method of FIG. 11.

FIG. 12 illustrates a call flow that serves as a more detailed example of the method 1100. Again, the service provider network 14 and the service provider network node 24 are generally understood to provide an M2M SP NSCL, and the wireless device 10 is understood as hosting an M2M application that provides a Device SCL and which is identified by an SCL-ID.

In the approach depicted in FIG. 12, the M2M SP NSCL retrieves the list of available/allowed external identifiers from the access network 12, or from some other node associated with the operator of the access network 12. For example, the M2M SP NSCL sends a subscription request to the IWF 22, which ultimately results in the IWF 22 forwarding a listing of external identifiers allocated for the M2M devices associated with the M2M SP.

In any case, based on a pre-agreed identifier definition, the M2M SP NSCL is able to create a second list that correlates each external identifier to the corresponding SCL-ID, or other such service provider network identifier. This process is possible because the external identifiers are structured or otherwise formed in a manner that is known to the M2M SP NSCL and that allows the M2M SP NSCL to obtain the corresponding service provider network identifier from each external identifier.

Thus, when one of the M2M devices later registers (as per step 6 in FIG. 12), it includes its service provider network identifier, e.g., its SCL-ID, within the registration signaling. The M2M SP NSCL searches its list of external identifiers and locates the entry corresponding to the SCL-ID that was included in the registration signaling. As such, it identifies the external identifier corresponding to the M2M device and stores it as part of the resources maintained for the M2M device, for later use in waking up the M2M device, etc., via communication through the access network 12.

Consider that Chapter 4.6 of 3GPP TS 23.682 v11.0.0 defines external identifiers for M2M SPs as follows:

External Identifier shall be globally unique. It shall have the following components: a. Domain Identifier that identifies a domain that is under the control of a Mobile Network Operator (MNO). The Domain Identifier is used to identify where services provided by the operator network can be accessed (e.g. MTC-IWF provided services). An operator may use different domain identifiers to provide access to different services. b. Local Identifier that is managed by the Mobile Network Operator. This identifier is used to derive or obtain the IMSI. The Local Identifier shall be unique within the applicable domain."

As can be seen above, the access network operator manages the local identifier part of an external identifier. Thus, the M2M SP NSCL can have knowledge of the local identifier part of an external identifier based on some pre-agreement between the NSCL and the access network operator. For example, an M2M SP wants to setup coffee machines in a building and at the same time that the M2M SP requests access network subscriptions for the coffee machines, the M2M SP enters M2M SP specific identities/names for each machine (e.g., M1, M2, etc.). At this point the M2M SP knows that the access network operator will allocate external identifiers including the machine identities/names in the local part of the external identifiers, e.g., separated by a "." or otherwise delineated in a known or agreed upon manner.

Such a pre-agreement allows the M2M SP NSCL to add the pre-agreed M2M SP identifier in each SCL record in such a way that when the M2M SP NSCL retrieves the available/allowed external identifiers from the access network 12, it can correlate each external identifier to the appropriate M2M SP NSCL record and the corresponding SCL-ID.

Turning to example details in the call flow of FIG. 12, at Step 1, at power on or other such initialization, the M2M SP NSCL subscribes to the IWF 22 belonging to the access network 12 in question, to be notified of the external identifiers available/allowed for the M2M SP NSCL. The IWF 22 in turn subscribes to HSS 20 for this information—which here may be considered as including AAA functionality. The HSS 20 responds to the subscription request from the IWF 22. In turn, the IWF 22 returns an acknowledgement response to the M2M SP NSCL, including the list of external identifiers.

In Step 2, the M2M SP NSCL achieves a binding between the external identifiers and the appropriate NSCL information, e.g. the corresponding SCL-IDs, etc., by checking the pre-agreed local identifier part of the external identifiers. The M2M SP NSCL now creates a new list, including the binding between the external identifiers and the extracted SCL-IDs, and stores the list to be used in subsequent procedures towards the access network 12 per related M2M SP Device SCLs (DSCLs).

In Step 3, an M2M device associated with the M2M SP NSCL attaches to/registers with the access network 12 using known procedures. In Step 4, the M2M device establishes IP connectivity using known procedures, e.g., the M2M device establishes a data session with the access network 12 based on activating a PDP context.

In Step 5, the SCL of the M2M device performs a service bootstrap with the M2M SP using existing ETSI procedures. In Step 6, the SCL of the M2M device registers with the M2M SP NSCL using existing ETSI procedures. The M2M DSCL-ID is included in the registration signaling and, as described above, this inclusion allows the M2M SP to locate the external identifier that corresponds to the M2M device, and optionally to store that external identifier as part of the resources maintained for the M2M device in the M2M SP network, for later use, e.g., in awakening the M2M device.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a network node that is associated with a service provider network, said method comprising:
   receiving a notification sent from an access network in response to a wireless device establishing a data session with the access network for communicating with the service provider network;
   reading an external identifier and a service provider network identifier from the notification, where the external identifier is assigned by the access network for use by the service provider network in identifying the wireless device to the access network and where the service provider network identifier identifies the wireless device within the service provider network with respect to a service;
   binding the external identifier to the service provider network identifier; and
   subsequently triggering communication with the wireless device via the access network by determining the external identifier that was bound previously to the service provider network identifier and sending trigger signaling toward the access network that indicates the external identifier;
   wherein the service provider network comprises a Machine Type Communication (MTC) network, wherein the service provider network identifier is a Services Capability Layer ID (SCL-ID) associated with an MTC application implemented in the wireless device, and wherein binding the external identifier to the service provider network identifier comprises binding the external identifier to the SCL-ID, for subsequent use by the service provider network in triggering communications with the wireless device through the access network.

2. The method of claim 1, further comprising receiving the notification based on previously sending a subscription request to an interworking function (IWF) that communicatively couples the network node to the access network.

3. The method of claim 1, wherein the notification indicates the external identifier either by including the external identifier, or by including an index value indicating which external identifier has been assigned to the wireless device by the access network, from within a list of external identifiers previously sent to the network node by the IWF in response to the subscription request.

4. The method of claim 1, further comprising identifying the access network from provisioned information stored in the network node.

5. A network node for use in association with a service provider network, said network node comprising:
   one or more communication interface circuits configured to communicate with a node in or associated with an access network; and
   a processing circuit operatively associated with the one or more communication interface circuits and configured to:
      receive a notification sent from an access network in response to a wireless device establishing a data session with the access network for communicating with the service provider network;
      read an external identifier and a service provider network identifier from the notification, where the external identifier is assigned by the access network for use by the service provider network in identifying the wireless device to the access network and where the service provider network identifier identifies the wireless device within the service provider network with respect to a service;
      bind the external identifier to the service provider network identifier; and
      subsequently trigger communication with the wireless device via the access network by determining the external identifier that was bound previously to the service provider network identifier and sending trigger signaling toward the access network that indicates the external identifier;
   wherein the service provider network comprises a Machine Type Communication (MTC) network, wherein the service provider network identifier is a Services Capability Layer ID (SCL-ID) associated with an MTC application implemented in the wireless device, and wherein the processing circuit is configured to bind the external identifier to the service provider network identifier by binding the external identifier to the SCL-ID, for subsequent use by the service provider network in triggering communications with the wireless device through the access network.

6. The network node of claim 5, wherein the access network is configured to send the notification based on having earlier received a subscription request from the service provider network, and wherein the processor circuit is configured to send the subscription request to an interworking function (IWF) that communicatively couples the network node to the access network, in advance of receiving the notification.

7. The network node of claim 6, wherein the notification indicates the external identifier either by including the external identifier, or by including an index value indicating which external identifier has been assigned to the wireless device by the access network, from within a list of external identifiers previously sent to the network node by the IWF in response to the subscription request, and wherein, in the case that the external identifier is indicated by an index value, the processing circuit is configured to map the index value to the corresponding external identifier.

8. The network node of claim 5, wherein the processing circuit is configured to identify the access network from provisioned information stored in the network node.

9. A method at a network node configured as an interworking function between an access network and a service provider network, said method comprising:
   receiving a notification sent from a Home Subscriber Server (HSS) or other node associated with the access network in response to a wireless device establishing a data session with the access network for communicating with the service provider network; and
   forwarding the notification to the service provider network;
   wherein the forwarded notification indicates an external identifier assigned by the access network for use by the service provider network in identifying the wireless device to the access network and a service provider network identifier used by the service provider network for identifying the wireless device with respect to a service provided by the service provider network; and wherein the service provider network comprises a Machine Type Communication (MTC) network, and wherein the service provider network identifier is a Services Capability Layer ID (SCL-ID) associated with an MTC application implemented in the wireless device.

10. The method of claim 9, wherein the wireless device is one among a plurality of wireless devices that are associated with the service provider network, and wherein the method includes:

in advance of receiving the notification from the HSS or other node associated with the access network, receiving a subscription request from the service provider network indicating that notifications for individual ones among the plurality of wireless devices should be sent to the service provider network responsive to the individual wireless devices establishing data sessions with the access network for communicating with the service provider network; and forwarding the subscription request to the HSS or other node associated with the access network, such that the HSS or other node subsequently sends the notification for the wireless device based on having first received the forwarded subscription request.

11. The method of claim 10, further comprising receiving a response to the forwarded subscription request from the HSS or other node associated with the access network, and forwarding the response to the service provider network, wherein the forwarded response indicates a list of external identifiers that are or will be used by the access network for allocation to respective ones of the plurality of wireless devices.

12. A network node configured to implement an interworking function (IWF) between an access network and a service provider network, said network node comprising:

one or more communication interface circuits configured to send signaling toward and to receive signaling from one or more nodes within the access network, and to send signaling toward and to receive signaling from one or more nodes within the service provider network; and a processing circuit operatively associated with the one or more communication interface circuits and configured to:

receive a notification sent from a Home Subscriber Server (HSS) or other node associated with the access network in response to a wireless device establishing a data session with the access network for communicating with the service provider network; and forward the notification to the service provider network;

wherein the forwarded notification indicates an external identifier assigned by the access network for use by the service provider network in identifying the wireless device to the access network and a service provider network identifier used by the service provider network for identifying the wireless device with respect to a service provided by the service provider network; and wherein the service provider network comprises a Machine Type Communication (MTC) network, wherein the service provider network identifier is a Services Capability Layer ID (SCL-ID) associated with an MTC application implemented in the wireless device.

13. The node of claim 12, wherein the wireless device is one among a plurality of wireless devices that are associated with the service provider network, and wherein the processing circuit is configured to:

in advance of receiving the notification from the HSS or other node associated with the access network, receive a subscription request from the service provider network indicating that notifications for individual ones among the plurality of wireless devices should be sent to the service provider network responsive to the individual wireless devices establishing data sessions with the access network for communicating with the service provider network; and forward the subscription request to the HSS or other node associated with the access network, such that the HSS or other node subsequently sends the notification for the wireless device based on having first received the forwarded subscription request.

14. The node of claim 13, wherein the processing circuit is configured to receive a response to the forwarded subscription request from the HSS or other node associated with the access network, and forward the response to the service provider network, wherein the forwarded response indicates a list of external identifiers that are or will be used by the access network for allocation to respective ones of the plurality of wireless devices.

15. A method in a network node configured as a Home Subscriber Server (HSS) in an access network, said method comprising:

receiving a service provider network identifier from a wireless device in conjunction with the wireless device establishing a data session with the access network for communicating with a service provider network that uses the service provider network identifier to identify the wireless device with respect to a service provided by the service provider network;

generating a notification that indicates the service provider network identifier and further indicates an external identifier assigned by the access network for use by the service provider network in identifying the wireless device to the access network; and sending the notification toward the service provider network, thereby enabling the service provider network to establish a binding between the service provider network identifier and the external identifier and subsequently trigger communication with the wireless device through the access network using the external identifier;

wherein the service provider network comprises a Machine Type Communication (MTC) network, wherein the service provider network identifier is a Services Capability Layer ID (SCL-ID) associated with an MTC application implemented in the wireless device, and wherein binding the external identifier to the service provider network identifier comprises the service provider network binding the external identifier to the SCL-ID, for subsequent use by the service provider network in triggering communications with the wireless device through the access network.

16. The method of claim 15, further comprising receiving a subscription request from the service provider network and responding to the subscription request by sending a response that indicates a list of external identifiers for allocation by the access network to individual ones among a plurality of wireless devices that are associated with the service provider network, and wherein sending the notification occurs in dependence on having first received the subscription request and wherein the notification includes an index value or other pointer identifying the external identifier within the list.

17. The method of claim 15, further comprising using provisioned information in or accessible to the HSS to identify the service provider network.

18. A network node configured as a Home Subscriber Server (HSS) in an access network, said network node comprising:
one or more communication interface circuits configured to communicate with an interworking function (IWF) that communicatively links the access network to a service provider network that is external to the access network;
a processing circuit that is operatively associated with the one or more communication interface circuits and, in response to a wireless device establishing a data session with the access network for communicating with the service provider network, is configured to:
receive a service provider network identifier from a wireless device in conjunction with the wireless device establishing a data session with the access network for communicating with a service provider network that uses the service provider network identifier to identify the wireless device with respect to a service provided by the service provider network;
generate a notification that indicates the service provider network identifier and further indicates an external identifier assigned by the access network for use by the service provider network in identifying the wireless device to the access network; and
send the notification toward the service provider network, thereby enabling the service provider network to establish a binding between the service provider network identifier and the external identifier and subsequently trigger communication with the wireless device through the access network using the external identifier;
wherein the service provider network comprises a Machine Type Communication (MTC) network, wherein the service provider network identifier is a Services Capability Layer ID (SCL-ID) associated with an MTC application implemented in the wireless device, and wherein binding the external identifier to the service provider network identifier comprises the service provider network binding the external identifier to the SCL-ID, for subsequent use by the service provider network in triggering communications with the wireless device through the access network.

19. The network node of claim 18, wherein the processing circuit is configured to receive a subscription request from the service provider network and respond to the subscription request by sending a response that indicates a list of external identifiers for allocation by the access network to individual ones among a plurality of wireless devices that are associated with the service provider network, and wherein the processing circuit is configured to send the notification in dependence on having first received the subscription request, and wherein notification includes an index value or other pointer identifying the external identifier within the list.

20. The network node of claim 18, wherein the processing circuit is configured to use provisioned information in or accessible to the HSS to identify the service provider network.

21. A method in a wireless device comprising:
reading a service provider network identifier from provisioned information stored in the wireless device, wherein the service provider network identifier identifies the wireless device with respect to a service provided by a service provider network;
generating one or more messages for activating a data session with an access network, for communicating with the service provider network, said one or more messages indicating the service provider network identifier; and
establishing the data session with an access network, based on sending signaling to the access network that includes the one or more messages;
wherein the service provider network comprises a Machine Type Communication (MTC) network, and wherein the service provider network identifier is a Services Capability Layer ID (SCL-ID) associated with an MTC application implemented in the wireless device.

22. The method of claim 21, further comprising identifying the service provider network from provisioned information stored in the wireless device.

23. A wireless device comprising:
a communication interface circuit configured to send signaling to and receive signaling from an access network;
one or more storage devices storing provisioned information;
a processing circuit that is operatively associated with the communication interface circuit and the one or more storage devices and is configured to communicate with the access network and with a service provider network that is external to the access network, via signaling sent through the access network, based at least in part on being configured to:
read a service provider network identifier from the provisioned information, wherein the service provider network identifier identifies the wireless device with respect to a service provided by the service provider network;
generate one or more messages for activating a data session with the access network, for communicating with the service provider network, said one or more messages indicating the service provider network identifier; and
establish the data session with an access network, based on sending signaling to the access network that includes the one or more messages;
wherein the processing circuit is configured to host or otherwise execute a Machine Type Communication (MTC) application and wherein the service is a Machine-to-Machine (M2M) service, the service provider network comprises a M2M service provider network, and the service provider network identifier is a Services Capability Layer ID (SCL-ID) that identifies the MTC application with respect to the M2M service provider network.

24. The wireless device of claim 23, wherein the processing circuit is configured to identify the service provider network from the provisioned information.

25. A method in a network node associated with a service provider network comprising:
receiving information from an access network indicating external identifiers allocated to wireless devices that are associated with the service provider network, wherein each external identifier is to be used by the service provider network in identifying a corresponding one of the wireless devices to the access network, and wherein each external identifier is based at least in part on a service provider network identifier of the corresponding wireless device;

processing each of the external identifiers to obtain the corresponding service provider network identifier, wherein each service provider network identifier is used by the service provider network to identify the corresponding wireless device within the service provider network;

binding the obtained service provider network identifiers with their corresponding external identifiers; and subsequently identifying a given one of the wireless devices within the service provider network according to the service provider network identifier of the given wireless device, determining which external identifier is bound to the service provider network identifier, and using the bound external identifier to trigger communication with the given wireless device via the access network;

wherein the service provider network comprises a Machine Type Communication (MTC) network, wherein the service provider network identifier is a Services Capability Layer ID (SCL-ID) associated with an MTC application implemented in the wireless device, and wherein binding the external identifier to the service provider network identifier comprises binding the external identifier to the SCL-ID, for subsequent use by the service provider network in triggering communications with the wireless device through the access network.

26. The method of claim 25, further comprising sending a subscription request to the access network, and wherein said step of receiving comprises receiving a subscription request response that is sent from the access network in response to receiving the subscription request from the service provider network.

27. A network node associated with a service provider network comprising:

one or more communication interface circuits configured to communicate with an access network; and a processing circuit that is operatively associated with the one or more communication-interface circuits and configured to:

receive information from an access network indicating external identifiers allocated to wireless devices that are associated with the service provider network, wherein each external identifier is to be used by the service provider network in identifying a corresponding one of the wireless devices to the access network, and wherein each external identifier is based at least in part on a service provider network identifier of the corresponding wireless device;

process each of the external identifiers to obtain the corresponding service provider network identifier, wherein each service provider network identifier is used by the service provider network to identify the corresponding wireless device within the service provider network;

bind the obtained service provider network identifiers with their corresponding external identifiers; and subsequently identify a given one of the wireless devices within the service provider network according to the service provider network identifier of the given wireless device, determine which external identifier is bound to the service provider network identifier, and use the bound external identifier to trigger communication with the given wireless device via the access network;

wherein the service provider network comprises a Machine Type Communication (MTC) network, wherein the service provider network identifier is a Services Capability Layer ID (SCL-ID) associated with an MTC application implemented in the wireless device, and wherein the processing circuit is configured to bind the external identifier to the service provider network identifier by binding the external identifier to the SCL-ID, for subsequent use by the service provider network in triggering communications with the wireless device through the access network.

* * * * *